US008086570B2

(12) United States Patent
Kawabe et al.

(10) Patent No.: US 8,086,570 B2
(45) Date of Patent: Dec. 27, 2011

(54) SECURE DOCUMENT MANAGEMENT USING DISTRIBUTED HASHING

(75) Inventors: Shigehisa Kawabe, Yokohama (JP);
Setsu Kunitake, Yokohama (JP);
Yoshihiro Ueda, Yokohama (JP);
Kenichi Numata, Yokohama (JP); Akira Suzuki, Yokohama (JP); Masao Nukaga, Yokohama (JP); Taro Terao, Kanagawa (JP); Meng Shi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 296 days.

(21) Appl. No.: 11/282,022

(22) Filed: Nov. 17, 2005

(65) Prior Publication Data

US 2006/0294152 A1    Dec. 28, 2006

(30) Foreign Application Priority Data

Jun. 27, 2005   (JP) .................. 2005-185934

(51) Int. Cl.
*G06F 7/00* (2006.01)
*G06F 17/00* (2006.01)
(52) U.S. Cl. .................. 707/638; 707/659; 709/229
(58) Field of Classification Search .................. 707/200, 707/10, 638, 659; 709/229; 705/14
See application file for complete search history.

(56) References Cited

U.S. PATENT DOCUMENTS

| | | | |
|---|---|---|---|
| 5,671,428 A | 9/1997 | Muranaga et al. | |
| 5,708,780 A * | 1/1998 | Levergood et al. | ........... 709/229 |
| 5,778,365 A | 7/1998 | Nishiyama | |
| 5,801,648 A | 9/1998 | Satoh et al. | |
| 5,806,078 A | 9/1998 | Hug et al. | |
| 5,897,643 A | 4/1999 | Matsumoto | |
| 5,940,617 A | 8/1999 | Tamura | |
| 5,940,830 A * | 8/1999 | Ochitani | .................. 707/999.01 |
| 5,983,241 A | 11/1999 | Hoshino | |
| 6,038,563 A * | 3/2000 | Bapat et al. | ..................... 707/10 |
| 6,094,654 A | 7/2000 | Van Huben et al. | |
| 6,289,460 B1 * | 9/2001 | Hajmiragha | .................... 726/28 |
| 6,615,253 B1 * | 9/2003 | Bowman-Amuah | .......... 709/219 |
| 6,662,230 B1 * | 12/2003 | Eichstaedt et al. | ............ 709/229 |
| 7,051,275 B2 | 5/2006 | Gupta et al. | |
| 7,086,003 B2 | 8/2006 | Demsky et al. | |

(Continued)

FOREIGN PATENT DOCUMENTS

CN            1577324           2/2005

(Continued)

OTHER PUBLICATIONS

"Chord: A Scalable Peer-to-peer Lookup Service for Internet Applications"; Stoica et al.; MIT Laboratory for Computer Science; pp. 1-12.

(Continued)

*Primary Examiner* — Apu Mofiz
*Assistant Examiner* — Chelcie Daye
(74) *Attorney, Agent, or Firm* — Gesmer Updegrove LLP

(57) ABSTRACT

The document management server includes an identification information providing unit that receives a request to obtain identification information required for accessing a document from a client, generates the identification information for the received request, and sends the generated identification information to the client; a relation information management unit that manages relation information of the requested document and the identification information generated for the request; and a history information management unit that manages information on the client who has sent the request, associating with the identification information.

16 Claims, 22 Drawing Sheets

U.S. PATENT DOCUMENTS

| | | | |
|---|---|---|---|
| 7,461,262 B1 * | 12/2008 | O'Toole, Jr. | 713/182 |
| 7,791,770 B2 | 9/2010 | Nomura | |
| 2002/0035525 A1 | 3/2002 | Yokota et al. | |
| 2002/0065812 A1 | 5/2002 | Keith, Jr. | |
| 2002/0091651 A1 * | 7/2002 | Petrogiannis et al. | 705/76 |
| 2002/0120506 A1 * | 8/2002 | Hagen | 705/14 |
| 2002/0154010 A1 | 10/2002 | Tu et al. | |
| 2002/0184366 A1 | 12/2002 | Kimoto et al. | |
| 2003/0154071 A1 * | 8/2003 | Shreve | 704/9 |
| 2003/0159035 A1 | 8/2003 | Orthlieb et al. | |
| 2003/0182262 A1 | 9/2003 | Yamamoto et al. | |
| 2004/0117363 A1 | 6/2004 | Ohno | |
| 2004/0205653 A1 | 10/2004 | Hadfield et al. | |
| 2004/0243576 A1 | 12/2004 | Shrivastava et al. | |
| 2004/0264811 A1 | 12/2004 | Yano et al. | |
| 2005/0004885 A1 | 1/2005 | Pandian et al. | |
| 2005/0021980 A1 * | 1/2005 | Kanai | 713/182 |
| 2005/0033777 A1 | 2/2005 | Moraes et al. | |
| 2005/0071755 A1 | 3/2005 | Harrington et al. | |
| 2005/0144308 A1 | 6/2005 | Harashima et al. | |
| 2005/0182785 A1 | 8/2005 | Oswalt | |
| 2006/0026042 A1 * | 2/2006 | Awaraji et al. | 705/3 |
| 2006/0047922 A1 | 3/2006 | Johnson et al. | |
| 2006/0050648 A1 | 3/2006 | Eydelman | |
| 2006/0112139 A1 | 5/2006 | Maple et al. | |
| 2006/0122985 A1 | 6/2006 | Yamamoto et al. | |
| 2006/0136513 A1 | 6/2006 | Ngo et al. | |
| 2006/0161516 A1 | 7/2006 | Clarke et al. | |
| 2006/0294152 A1 | 12/2006 | Kawabe et al. | |
| 2007/0011211 A1 | 1/2007 | Reeves et al. | |
| 2007/0094740 A1 | 4/2007 | Shudo | |
| 2007/0112742 A1 | 5/2007 | Dumais et al. | |
| 2007/0130166 A1 | 6/2007 | Takahashi | |
| 2007/0139701 A1 | 6/2007 | Nomura | |
| 2007/0162441 A1 | 7/2007 | Idicula et al. | |
| 2007/0288438 A1 | 12/2007 | Epstein | |
| 2007/0299969 A1 | 12/2007 | Kunitake et al. | |
| 2008/0005024 A1 | 1/2008 | Kirkwood | |
| 2008/0018926 A1 | 1/2008 | Abraham et al. | |
| 2008/0040388 A1 | 2/2008 | Petri et al. | |
| 2008/0115055 A1 | 5/2008 | Sadovsky et al. | |
| 2008/0177755 A1 | 7/2008 | Stern et al. | |
| 2009/0024647 A1 | 1/2009 | Hein | |
| 2009/0083831 A1 | 3/2009 | Kanai | |
| 2009/0228969 A1 | 9/2009 | Garg et al. | |

FOREIGN PATENT DOCUMENTS

| | | |
|---|---|---|
| EP | 1083492 A2 | 3/2001 |
| JP | 62241061 | 10/1987 |
| JP | 6077994 | 3/1994 |
| JP | 056794 | 3/1995 |
| JP | 8292961 | 11/1996 |
| JP | 9223056 | 8/1997 |
| JP | 11053243 | 2/1999 |
| JP | 11327980 | 11/1999 |
| JP | 2000231509 | 8/2000 |
| JP | 2000347943 | 12/2000 |
| JP | 2000020377 | 1/2001 |
| JP | 2001125812 A | 5/2001 |
| JP | 2001350667 | 12/2001 |
| JP | 2002-16788 | 1/2002 |
| JP | 2002014978 | 1/2002 |
| JP | 2002328865 | 11/2002 |
| JP | 2003058395 | 2/2003 |
| JP | 2003303122 | 10/2003 |
| JP | 2004021529 A | 1/2004 |
| JP | 2004110692 | 4/2004 |
| JP | 2004310244 A | 4/2004 |
| JP | 2005135211 | 5/2005 |
| JP | 2005518602 | 6/2005 |
| JP | 2005189995 A | 7/2005 |
| JP | 2005338935 | 12/2005 |
| JP | 2006024059 | 1/2006 |
| JP | 2006053686 | 2/2006 |
| JP | 2007004649 | 1/2007 |
| KR | 1020060049337 | 5/2006 |
| KR | 1020060092859 | 8/2006 |
| WO | 03073272 | 9/2003 |

OTHER PUBLICATIONS

Office Action from the Chinese Patent Office for corresponding Chinese Application No. 2006100063241, along with an English Translation.

Stoica et al, "A Scalable Peer-to-peer Lookup Service for Internet Applications"; MIT Laboratory for Computer Science; Aug. 27-31, 2001, San Diego, CA; pp. 1-12.

Office Action for U.S. Appl. No. 11/282,022, filed Nov. 17, 2005; Shigehisa Kawabe; Document Management Server, Document Management System, Computer-Readable Recording Medium, Document Management Method, Client Management System, and Node.

U.S. Appl. No. 11/282,022, filed Nov. 17, 2005, Kawabe et al., Document Management Server, Document Management System, Computer Readable Recording Medium, Document Management Method, Client of Document Management System, and Node.

U.S. Appl. No. 11/671,519, filed Feb. 6, 2007, Kunitake et al., "Document Management Server, Method, Storage Medium and Computer Data Signal, and System for Managing Document Use".

U.S. Appl. No. 11/748,626, filed May 15, 2007, Kawabe et al., "Document Providing System and Computer-Readable Storage Medium".

U.S. Appl. No. 11/839,715, filed Aug. 16, 2007, Masao Nukaga; "Information-Processing Apparatus, Information-Processing System, Information-Processing Method, Computer-Readable Medium, and Computer Data Signal".

U.S. Appl. No. 11/753,690, filed May 25, 2007, Akira Suzuki; "Information Processing Apparatus, Information Processing System, and Computer Readable Storage Medium".

U.S. Appl. No. 11/939,708, filed Nov. 14, 2007, Katsunori Houchi; "Information Processing Apparatus, Information Processing System, Information Processing Method, and Computer Readable Storage Medium".

U.S. Appl. No. 11/942,943, filed Nov. 20, 2007, Setsu Kunitake; "Information Processing Apparatus, Information Processing System, and Storage Medium".

Taro Takashima; "Information Processing Apparatus, Information Processing System, Storage Medium, Information Processing Method, and Data Signal"; U.S. Appl. No. 12/112,211, filed Apr. 30, 2008.

Taro Yoshihama; "Document Management Apparatus, Document Management System and Method, and Computer-Readable Medium"; U.S. Appl. No. 12/055,530, filed Mar. 26, 2008.

Office Action issued on Feb. 21, 2009 from the Chinese Patent Office for corresponding Chinese Patent Application No. 200710005902.4, with English translation.

Korean Office Action with partial English translation, mailed on Dec. 2, 2008, corresponding to Korean Patent Application No. 10-2007-0058939.

Office Action for U.S. Appl. No. 11/753,690, mailed on May 28, 2009.

Office Action for U.S. Appl. No. 11/671,519, mailed on Jun. 2, 2009.

US Office Action issued in connection with U.S. Appl. No. 11/753,690, mailed on Nov. 5, 2009.

US Office Action issued in U.S. Appl. No. 11/942,943 mailed on Jan. 19, 2010.

US Office Action issued in U.S. Appl. No. 11/942,943 mailed on Jun. 7, 2010.

US Office Action issued in U.S. Appl. No. 11/748,626 mailed on Jun. 10, 2010.

US Office Action issued in U.S. Appl. No. 11/939,708 mailed on Jul. 27, 2010.

U.S. Office Action issued in U.S. Appl. No. 12/112,211 mailed on Aug. 31, 2010.

Tedjini, Mohamed et al. "A Query Service for a Software Engineering Database System," ACM 1990, pp. 238-248.

U.S. Office Action issued in U.S. Appl. No. 11/839,715 mailed on Oct. 7, 2010.

Office Action issued in connection with U.S. Appl. No. 11/748,626 mailed Nov. 26, 2010.

English translation of Office Action issued in connection with Japanese Patent Application No. 2005-185934 mailed on Nov. 16, 2010.

Office Action issued in connection with U.S. Appl. No. 11/753,690 mailed on Jan. 3, 2011.

Office Action mailed on Apr. 12, 2011, in connection with corresponding U.S. Appl. No. 11/942,943.

U.S. Office Action issued on May 9, 2011, in corresponding U.S. Appl. No. 12/055,530.

Japanese Notice of Grounds of Rejection issued on Aug. 9, 2011 in connection with JP Application No. 2006-172736 with excerpt English translation thereof.

Office Action issued on Sep. 7, 2011, in connection with corresponding U.S. Appl. No. 11/942,943.

* cited by examiner

| EVENT ATTRIBUTE | USER ID | ORIGINAL COPY ID/ DUPLICATE COPY ID | EVENT DATE/TIME |
|---|---|---|---|
| DOCUMENT REGISTRATION | abc01 | 1238807 | 2005/5/13 11:14:36 |
| SHORTCUT GENERATION | abc02 | 5034568 | 2005/5/13 15:35:06 |
| DOCUMENT REGISTRATION | abc11 | 1230569 | 2005/5/19 9:04:38 |
| DUPLICATE COPY PROVISION | abc14 | 6704570 | 2005/6/16 11:10:30 |
| DUPLICATE COPY PROVISION | abc15 | 2794571 | 2005/6/17 19:14:42 |
| SHORTCUT GENERATION | abc02 | 1234572 | 2005/6/18 11:59:11 |

Fig. 6

| FILE NAME | CREATION USER NAME | CREATION DATE/TIME | ORIGINAL COPY ID |
|---|---|---|---|
| aaaa | abc01 | 2005/5/13 11:14:36 | 1238807 |
| abcd | abc02 | 2005/5/13 15:35:06 | 5034568 |
| bbb | abc11 | 2005/5/19 9:04:38 | 1230569 |
| ddddd | abc14 | 2005/6/16 11:10:30 | 6704570 |
| eeee | abc15 | 2005/6/17 19:14:42 | 2794571 |
| kkkk | abc02 | 2005/6/18 11:59:11 | 1234572 |

Fig. 8

| EVENT ATTRIBUTE | USER ID | ORIGINAL COPY ID/ DUPLICATE COPY ID | EVENT DATE/TIME |
|---|---|---|---|
| DOCUMENT REGISTRATION | abc01 | [0] | 2005/5/13 11:14:36 |
| SHORTCUT GENERATION | abc02 | [1-1] | 2005/5/13 15:35:06 |
| DOCUMENT REGISTRATION | abc11 | [10] | 2005/5/19 9:04:38 |
| DUPLICATE COPY PROVISION | abc14 | [2-1] | 2005/6/16 11:10:30 |
| DUPLICATE COPY PROVISION | abc15 | [2-2] | 2005/6/17 19:14:42 |
| SHORTCUT GENERATION | abc02 | [1-2] | 2005/6/18 11:59:11 |

Fig. 13

FOLDER A
142

| FILE NAME | CREATOR | UPDATE DATE | SIZE | |
|---|---|---|---|---|
| aaaaaaa | abc01 | 2005-01-10 | 25KB | REGISTER |
| bbbbbbb | bdc00 | 2005-02-01 | 1268KB | REGISTER |
| wwwww | xyz87 | 2004-10-27 | 2540KB | REGISTER |

140

GROUP REGISTRATION
144

Fig. 17

```
200 {<originalDoc>
202 {<filename">contract.pdf</filename>
204 {<contentType>application/pdf</contentType>
206 {<creator>taro.terao@fujixerox.co.jp</creator>
208 {<createdTime>Tue, 24 May 2005 04:24:15 GMT</createdTime>
    <contentHash>
210   6ba6d3a4f9e24a918e841d09ba445e1944983e3d1691c056aa3c3017865f6d6e
    </contentHash>
200 {</originalDoc>
```

Fig. 20A

```
300 ⎰ <derivedDoc>
302 ⎰ <accessor>taro.terao@fujixerox.co.jp</accessor>
304 ⎰ <accessedTime>Tue, 24 May 2005 10:08:02 GMT</accessedTime>
    ⎰ <contentHash>
306 ⎱   89312cd6c7b1adced6cb48d203113ed853b387efabc4cafb863ca31863252d8
    ⎱ </contentHash>
300 ⎱ </derivedDoc>
```

Fig. 20B

| UNIQUE ID OF DUPLICATE COPY META INFORMATION | USER ID TO WHICH DUPLICATE COPY SHORTCUT WAS PROVIDED |
|---|---|

SECURE DOCUMENT MANAGEMENT USING DISTRIBUTED HASHING

BACKGROUND OF THE INVENTION (i) Field of the Invention

The present invention relates to a document management device that manages electronic documents and provides electronic documents requested by a user.

(ii) Description of the Related Art

Techniques for providing a user with data have been disclosed. According to one of the techniques, the user receives electronic mail including reference information necessary for accessing available files and, on the basis of the reference information included in the electronic mail, obtains a desired file from a file server.

The technique disclosed above allows the file server to manage which user has requested a file on the basis of reference information. Even if reference information on the same file is provided to multiple users, the file server can manage which users have received the reference information. However, because reference information is information necessary for accessing a file, the reference information on a given file located in a given area is always the same. Therefore, if a user distributes provided reference information to another user and the other user requests to obtain the file on the basis of the distributed reference information, the file server cannot identify which user originally received the reference information.

SUMMARY OF THE INVENTION

The present invention provides a system where, even when the same file is provided to multiple users, a user to whom the information required for requesting the file was originally provided can be identified.

According to one aspect of the present invention, there is provided a document management server which includes an identification information providing unit that receives a request to obtain identification information required for accessing a document from a client, generates the identification information for the received request, and sends the generated identification information to the client; a relation information management unit that manages relation information of the requested document and the identification information generated for the request; and a history information management unit that manages information on the client who has sent the request, associating with the identification information.

According to another aspect of the present invention, there is provided a document management system which includes an identification information providing unit that receives a request to obtain identification information required for accessing a document from a client, generates the identification information for the received request, and sends the generated identification information to the client; a relation information management unit that manages relation information of the requested document and the identification information generated for the request; and a history information management unit that manages information of the client who has sent the request, associating with the identification information.

According to a further aspect of the present invention, there is provided a storage medium readable by a computer, the storage medium storing a program of instructions executable by the computer to function as a document management server. The function includes receiving a request to obtain identification information required for accessing a document from a client; generating the identification information for the received request; sending the generated identification information to the client; managing relation information of the requested document and the identification information generated for the request; and managing information of the client who has sent the request associating with the identification information.

According to a still further aspect of the present invention, there is provided a storage medium readable by a computer, the storage medium storing a program of instructions executable by the computer to function as a client that obtains a document via a network. The function includes an identification information obtaining unit that sends an obtaining request designating a document to be obtained and obtains the identification information, as a response to the obtaining request; a document obtaining unit that sends a document access request, which designates the obtained identification information, and obtains a document associated with the identification information and an updating information as a response to the access request; and an identification information changing unit that changes the identification information designated by the access request, according to the updating information.

According to another aspect of the present invention, there is provided a node connected to a Peer-to-Peer network using a distributed hash table and sharing documents with other nodes. The node includes a document registration unit that generates first meta information including a hash value of a document to be registered and sends the document to be registered and the first meta information to a node where the document and the first meta information are to be stored; a shortcut issuance unit that, in response to a request for browsing a document, obtains the first meta information corresponding to the document and generates second meta information including a hash value of the first meta information, issues the shortcut including a hash value of the second meta information, and provides the shortcut to a user who has requested; a relation information management unit that manages relation information of the first meta information and the second meta information; and a history information management unit that manages information of a user to which the shortcut has been provided and a hash value of the second meta information included in the shortcut.

According to a further aspect of the present invention, there is provided a document management server that manages history information on access to documents. The document management server includes an identification information providing unit that receives a request to access a document from a client, and generates identification information for the received request; and a history information management unit that manages information of the requested document, the generated identification information, and a client who has sent a request to access the document based on the identification information.

According to a still further aspect of the present invention, there is provided a document management method which includes receiving a request to obtain identification information required for accessing a document from a client; generating the identification information for the received request; sending the generated identification information to the client; managing relation information of the requested document and the identification information generated for the request; and managing information of the client who has sent the request associating with the identification information.

According to a yet further aspect of the present invention, there is provided a client of a document management system. The client includes an identification information obtaining unit that sends the obtaining request to the document management server and receives identification information as a response; a document obtaining unit that sends a document access request, which designates the obtained identification information, and obtains a document associated with the identification information and an updating information as a response to the access request; and an identification information changing unit that changes the identification information designated by the access request, according to the updating information.

BRIEF DESCRIPTION OF THE DRAWINGS

Embodiments of the present invention will be described in detail by reference to the drawings, wherein;

FIG. 6 is a diagram showing an example of history information managed by a history information management unit;

FIG. 8 is a diagram showing an example of a document list table provided to a client by the document management server;

FIG. 13 is a diagram showing an example of history information managed by the history information management unit;

FIG. 17 is a diagram showing an example of a document selection screen provided to a client by the file server;

FIG. 20A is a diagram showing an example of the tag configuration of an XML document describing original copy meta information;

FIG. 20B is a diagram showing an example of the tag configuration of an XML document describing duplicate copy meta information;

DETAILED DESCRIPTION OF THE INVENTION

Embodiments of the present invention will be described below with reference to the drawings.

Figure 1:
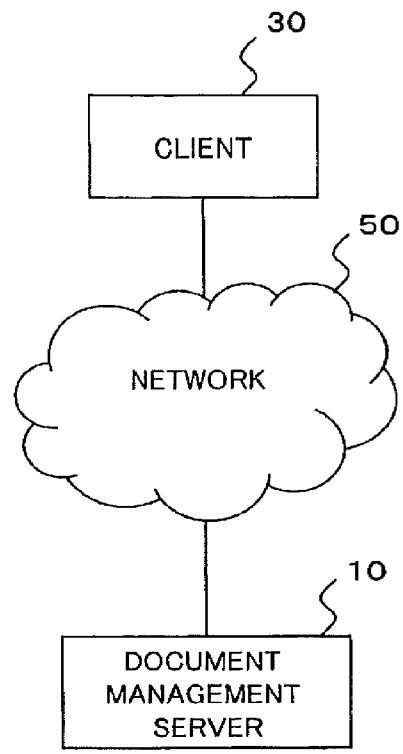
FIG. 1 is a diagram showing the general configuration of a document management system of an embodiment of the present invention.

FIG. 1 is a diagram showing the general configuration of a document management system of an embodiment. As shown in FIG. 1, this system includes a document management server 10 and a client 30, both of which are connected to a network 50 such as a LAN (Local Area Network) or the Internet. In this system, the document management server 10 manages the original copies of documents. To browse a document managed by the document management server 10, the client 30 sends to the document management server 10 identification information, which identifies the document to be browsed. On the basis of the identification information, the document management server 10 identifies an original copy, copies a document included in the original copy, and provides data, including the copied document, to the client 30 as a duplicate copy. The term "document" as used herein refers to all data transmittable on the network 50, such as a text file, an image file, an audio file, and a moving image file.

Figure 2:
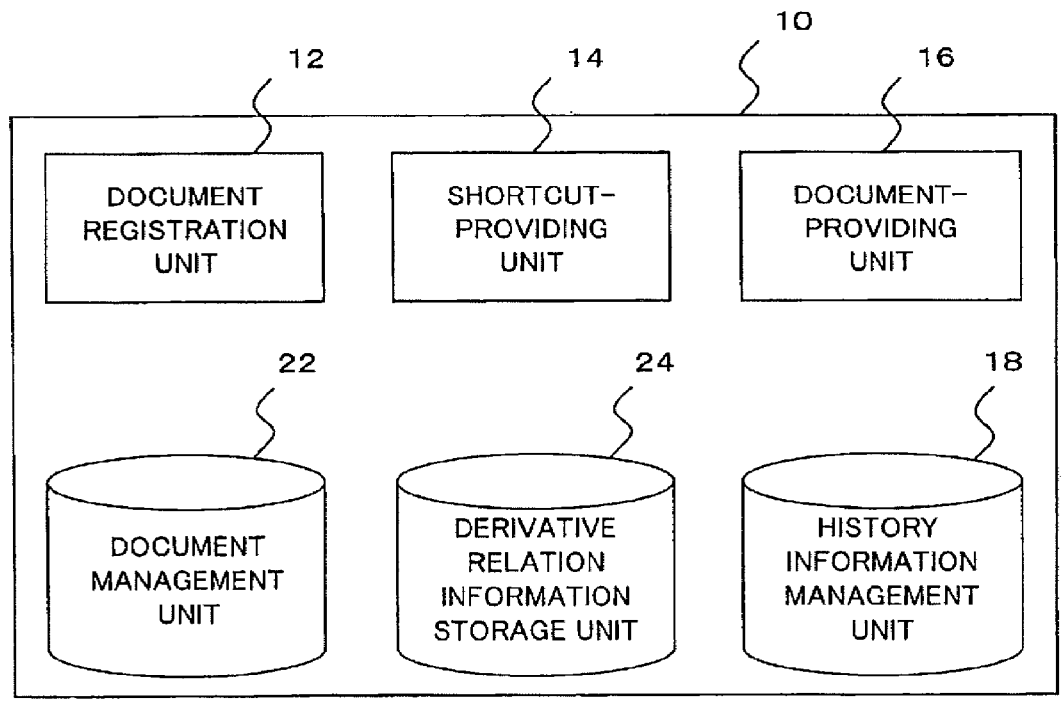
FIG. 2 is a functional block diagram of a document management server of the embodiment.

FIG. 2 is a functional block diagram of the document management server 10. In FIG. 2, a document registration unit 12 executes a document registration event. More specifically, in response to a document registration request from the client 30, the document registration unit 12 creates a set composed of a document included in the document registration request and the attribute of the document, and registers the set in a document management unit 22 as the original copy. When registering the original copy, the document registration unit 12 generates an original copy ID uniquely identifying the original copy and registers the original copy and the original copy ID, which are associated with each other, in the document management unit 22. The document registration unit 12 registers the generated original copy ID in derivative relation information stored in a derivative relation information storage unit 24. The derivative relation information will be described later.

The attribute of a document as used herein refers to a file name of the document, a name of a user who created the document, creation date of the document, or the like.

An original copy ID, preferably a character string whose pattern is difficult to guess, can be a random number generated on the basis of a known random number generation algorithm. Alternatively, an original copy ID may be a hash value of a sufficiently large data size calculated for data specific to the original copy. For example, a known message digest algorithm such as the SHA-256 algorithm is used for calculation of a hash value. Data specific to the original copy are, for example, contents of the document or the attribute of the document. XML document describing the hash value of the content of the document and the hash value of the attribute of the document may also be used as data specific to the original copy. The XML document may also include an additional random number.

A shortcut-providing unit 14 executes a duplicate copy shortcut issuance event. More specifically, in response to a duplicate copy shortcut request from the client 30, the shortcut-providing unit 14 issues a duplicate copy shortcut corresponding to the original copy ID included in the duplicate copy shortcut request and provides the issued duplicate copy shortcut to the client 30. The duplicate copy shortcut is a file including reference information necessary for the client 30 to browse a document. More specifically, the duplicate copy shortcut includes access site information indicating the host name of the document management server 10 and the request URL (Uniform Resource Locator) used for document browsing, the duplicate copy ID associated with the original copy ID of a document to be browsed, and the attribute of the duplicate copy shortcut. Note that the duplicate copy shortcut does not include the entity of the document. The file format of the duplicate copy shortcut is, for example, PDF (Portable Document Format).

The client 30 references the reference information included in the duplicate copy shortcut and sends a document-browsing request, which specifies the duplicate copy ID, to the request URL included in the reference information to obtain a duplicate copy including the copied document of the document to be browsed.

Figure 3:
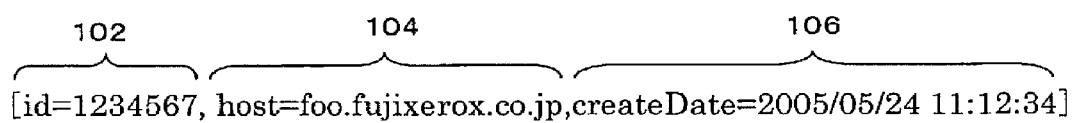
FIG. 3 is a diagram showing an example of data included in a duplicate copy shortcut.

The duplicate copy ID, which is a unique value that does not duplicate any of already-generated original copy IDs and other duplicate copy IDs, may be a random number or a hash value for the attribute of the duplicate copy such as that described above. The attribute of a duplicate copy is, for example, the original copy ID included in the duplicate copy shortcut request, the time of receipt of the duplicate copy shortcut request, or the user ID of the client 30 requesting the duplicate copy shortcut. FIG. 3 shows an example of data included in a duplicate copy shortcut. FIG. 3 shows data included in a duplicate copy shortcut: a duplicate copy ID 102, a host name 104, and the creation date and time 106 of a duplicate copy shortcut.

Figure 4A:
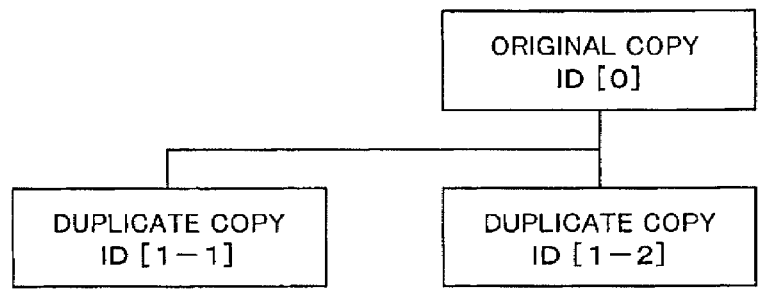
FIG. 4A is a diagram showing an example of tree structure data indicating the derivative relation of an original copy ID and duplicate copy IDs.
Figure 4B:
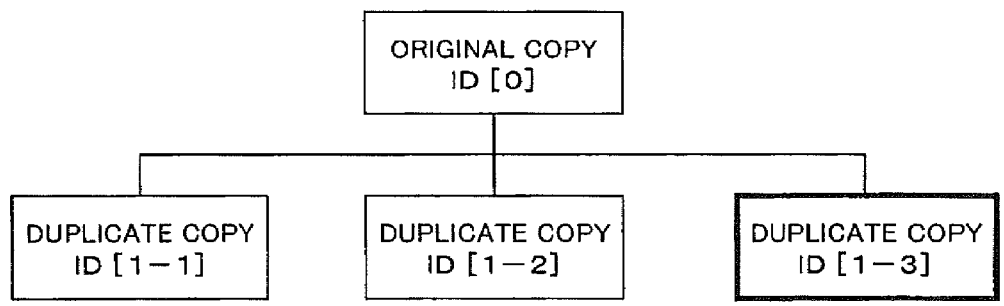
FIG. 4B is a diagram showing an example of tree structure data indicating the derivative relation of an original copy ID and duplicate copy IDs.

After generating the duplicate copy ID, the shortcut-providing unit 14 updates derivative relation information stored in the derivative relation information storage unit 24. The derivative relation information indicates the derivative relation between an original copy ID and a duplicate copy ID corresponding to the original copy ID, and its data structure is represented as a tree structure. The document management server 10 references this derivative relation information to determine from which original copy ID a duplicate copy ID has been generated. FIG. 4A is a diagram showing an example of a derivative relation represented by the derivative relation information. FIG. 4A shows that the shortcut-providing unit 14 has generated the duplicate copy ID [1-1] and the duplicate copy ID [1-2] for the original copy ID [0]. When the shortcut-providing unit 14 generates an additional duplicate copy ID [1-3] for the original copy ID [0] having the derivative relation shown in FIG. 4A, the shortcut-providing unit 14 updates the derivative relation as shown in FIG. 4B so that the duplicate copy ID [1-3] becomes a child of the original copy ID [0].

As shown in FIG. 2, a document-providing unit 16 executes a document-providing event. More specifically, in response to a document browsing request from the client 30, the document-providing unit 16 reads the duplicate copy ID from the document-browsing request and references the derivative relation information to identify the original copy ID that is the root of the duplicate copy ID. Next, the document-providing unit 16 obtains the original copy, related to the identified original copy ID, from the document management unit 22 and copies the document included in the original copy. The document-providing unit 16 generates a new duplicate copy ID in the same manner as the shortcut-providing unit 14, and registers the generated duplicate copy ID in the derivative relation information so that the new duplicate copy ID becomes a child of the duplicate copy ID specified by the document-browsing request. In addition, the document-providing unit 16 provides a duplicate copy, including the copied document and the new duplicate copy ID, to the client 30. The client 30 uses the new duplicate copy ID, included in the duplicate copy, to update the duplicate copy ID included in the duplicate copy shortcut maintained on the client 30.

Figure 5A:
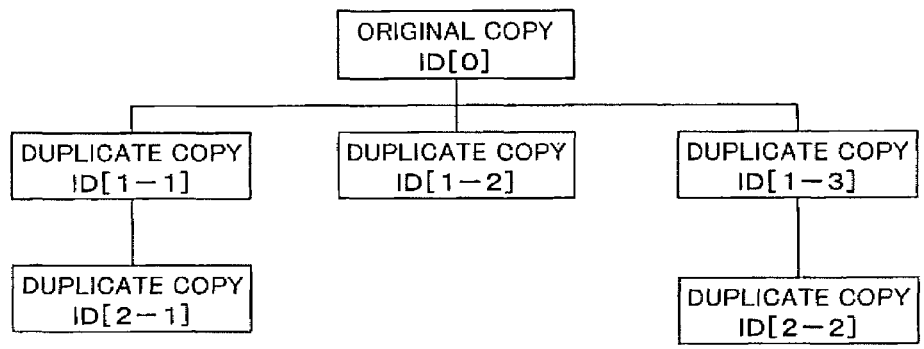
FIG. 5A is a diagram showing an example of tree structure data indicating the derivative relation of an original copy ID and duplicate copy IDs.
Figure 5B:
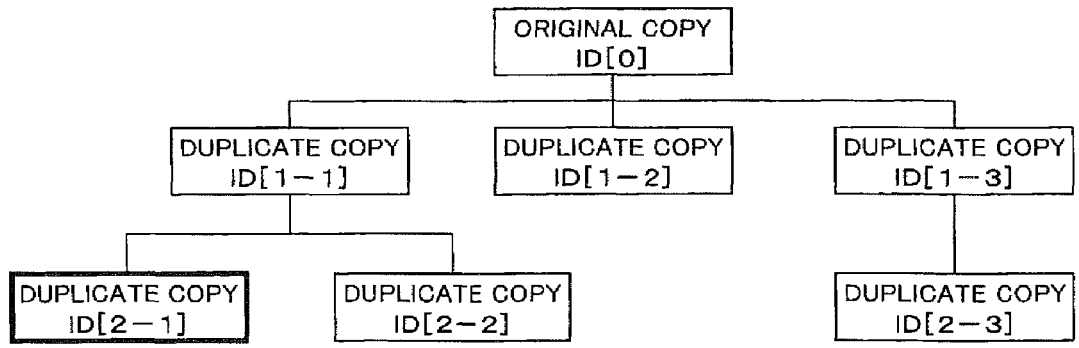
FIG. 5B is a diagram showing an example of tree structure data indicating the derivative relation of an original copy ID and duplicate copy IDs.

A duplicate copy ID generated by the document-providing unit 16 is generated in the same manner as a duplicate copy ID generated by the shortcut-providing unit 14; that is, it may be a random number or a hash value for the attribute of a duplicate copy ID. FIG. 5A is a diagram showing an example of a derivative relation in which a duplicate copy ID generated by the document-providing unit 16 is added. FIG. 5B is a diagram showing the derivative relation indicating that the document-providing unit 16 has generated a new duplicate copy ID, [2-1], for the duplicate copy ID [1-1] specified by the document-browsing request.

A history information management unit 18 manages history information of the events executed by the document registration unit 12, the shortcut-providing unit 14, and the document-providing unit 16. That is, when the document registration unit 12 executes a document registration event, the history information management unit 18 manages, as history information, the user ID requesting the registration of a document, the original copy ID generated at that time, and the registration date and time. When the shortcut-providing unit 14 executes a duplicate copy shortcut issuance event, the history information management unit 18 manages, as history information, the user ID requesting the duplicate copy shortcut, the duplicate copy ID generated at that time, and the generation date and time. In addition, when the document-providing unit 16 executes a duplicate copy providing event, the history information management unit 18 manages, as history information, the user ID requesting the duplicate copy (that is, the user ID requesting the browsing of a document), the new duplicate copy ID (for updating) generated at that time, and the duplicate copy providing date and time. FIG. 6 shows an example of history information managed by the history information management unit 18.

As described above, even if the same document is requested, the shortcut-providing unit 14 in this system generates a unique duplicate copy ID for each duplicate copy shortcut request and provides to the client 30 a duplicate copy shortcut, including the generated duplicate copy ID. Therefore, the history information, managed by the history information management unit 18 as described above, indicates which duplicate copy shortcut is provided to which user.

Because a duplicate copy shortcut does not include the entity of a document, a third party who receives a copy of the duplicate copy shortcut must access the document management server 10 to browse the document. In addition, when a user copies a duplicate copy shortcut and provides the copied shortcut to another user, it is also possible to keep track of which duplicate copy shortcut (that is, to which user the duplicate copy shortcut was originally generated) the other user uses to request browsing of a document.

Figure 7:
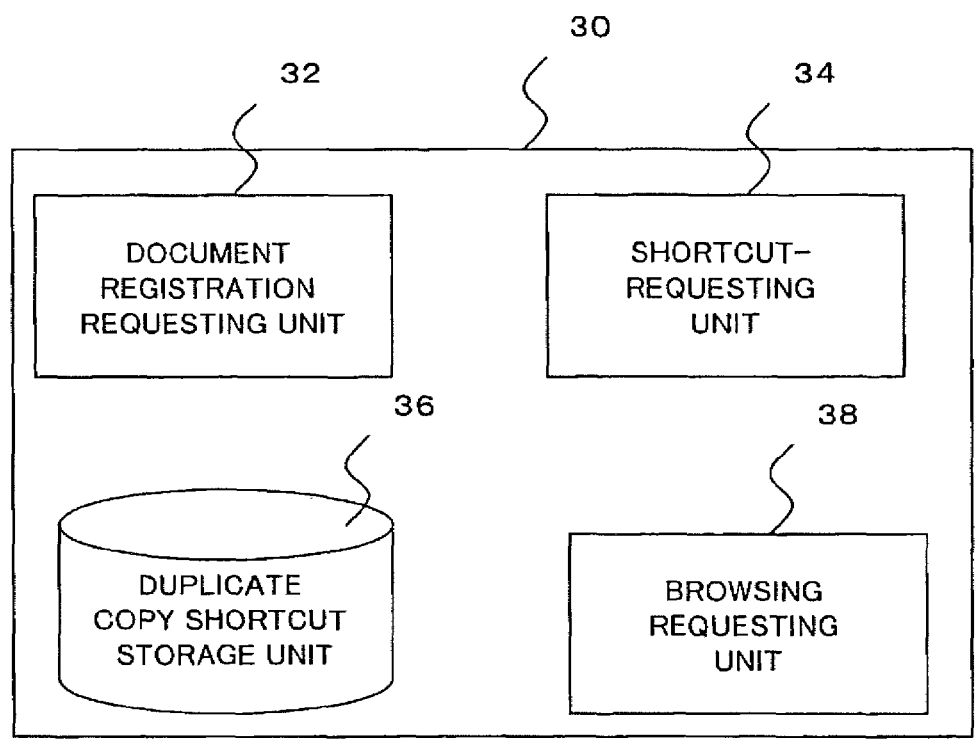
FIG. 7 is a functional block diagram of a client of the embodiment.

FIG. 7 is a functional block diagram of the client 30. As shown in FIG. 7, when registering a new document in the document management server 10, a document registration requesting unit 32 sends a document registration request, including the document, to the document management server 10.

A shortcut-requesting unit 34 sends a duplicate copy shortcut request for a document to the document management server 10 and receives the duplicate copy shortcut. More specifically, the shortcut-requesting unit 34 first obtains a document list table from the document management server 10. As shown in FIG. 8, the document list table stores the attribute information, such as file names, and original copy IDs of the documents available to the client 30. Next, the shortcut-requesting unit 34 sends to the document management server 10 a duplicate copy shortcut request, specifying the original copy ID of a user-selected document selected from the obtained document list table. Subsequently, the shortcut-requesting unit 34 receives a duplicate copy shortcut from the document management server 10 as a response to the duplicate copy shortcut request and stores the received duplicate copy shortcut in a duplicate copy shortcut storage unit 36.

A browsing-requesting unit 38 requests the document management server 10 for the duplicate copy of a document to be browsed. More specifically, the browsing-requesting unit 38 obtains a user-specified duplicate copy shortcut from the duplicate copy shortcut storage unit 36. The browsing-requesting unit 38 sends a document-browsing request, which specifies the duplicate copy ID included in the duplicate copy shortcut, to the request URL included in the obtained duplicate copy shortcut. Subsequently, the browsing-requesting unit 38 receives a duplicate copy from the document management server 10 as a response to the document-browsing request and displays on the screen the document included in the duplicate copy. In addition, the browsing-requesting unit 38 rewrites the duplicate copy ID, included in the duplicate copy shortcut obtained previously, into a new duplicate copy ID (generated for updating) included in the received duplicate copy.

Figure 9:
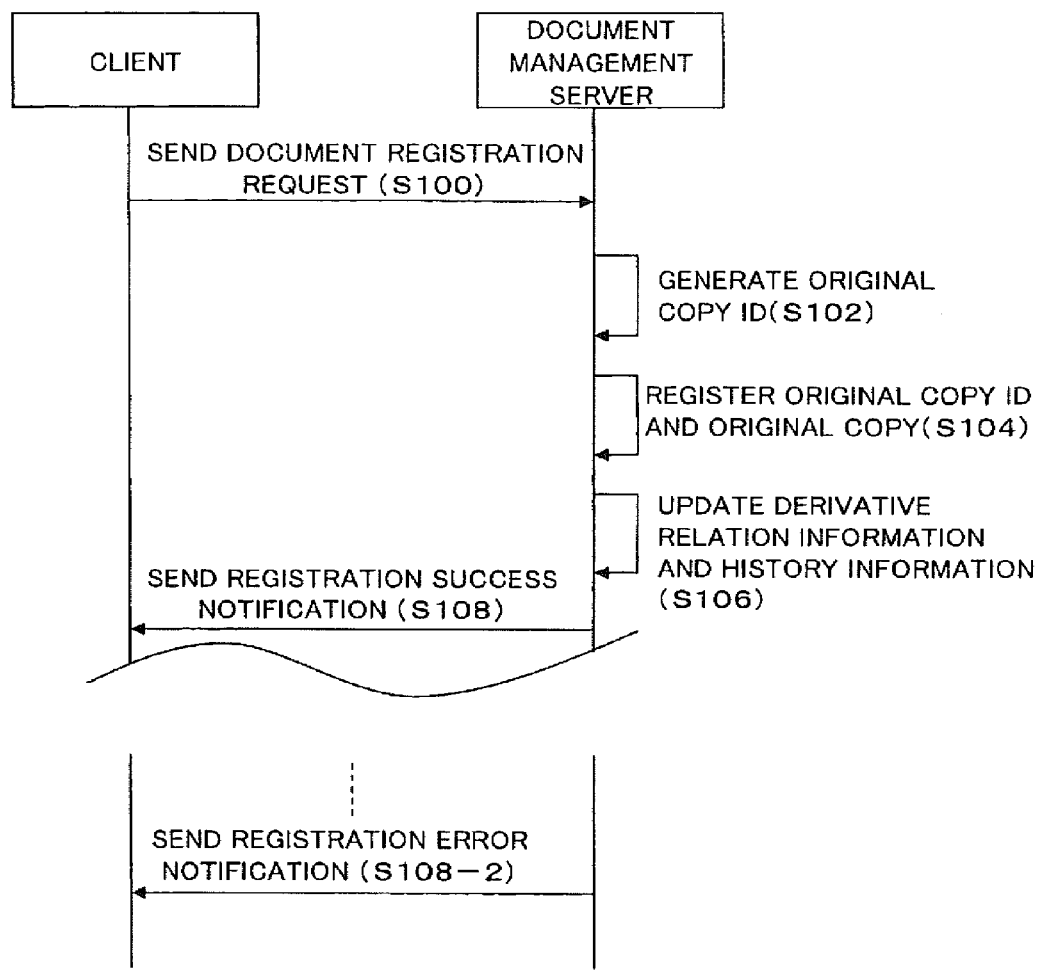
FIG. 9 is a diagram showing the processing procedure executed by the document management server and a client when a document registration event is executed.

Next, with reference to FIG. 9, the processing procedure carried out by the document management server 10 and the client 30 for executing a document registration event will be described.

First, the client 30 sends to the document management server 10 a document registration request, which includes a document to be registered and metadata (hereinafter called document metadata) on the contents of the document (S100). Note that, when the document management server 10 and the client 30 communicate with each other via HTTP (HyperText Transfer Protocol), the client 30 uses an HTTP request to send a document registration request to the document management server 10.

In response to the received document registration request, the document management server 10 generates an original copy ID for the document included in the request (S102). For example, the document management server 10 calculates a hash value (hereinafter called a document hash value) of document metadata included in the document registration request and defines the calculated document hash value as the original copy ID. In this case, if the client 30 side also calculates the document hash value and includes the calculated value in the document registration request, the document management server 10 can check if the document hash value calculated by the client 30 side matches the document hash value calculated by the document management server 10, to thereby confirm that the data included in the received document registration request have not been not altered.

After generating the original copy ID, the document management server 10 associates the original copy, composed of the document to be registered and its attribute, with the original copy ID generated in S102 and registers the original copy and the original copy ID in the document management unit 22 (S104). At this time, the document management server 10 uses, for example, the document hash value as the file name of the document and registers the document in the document management unit 22 as the original copy. After registering the original copy, the document management server 10 updates the derivative relation information and the history information (S106). That is, the document management server 10 adds the original copy ID to the derivative relation information and, at the same time, adds the contents of this event to the history information. Subsequently, the document management server 10 sends a registration success notification to the client 30 (S108) On the other hand, if the registration of the requested document fails, the document management server 10 sends a registration error notification to the client 30 (S108-2). If the document management server 10 and the client 30 communicate with each other via HTTP, the document management server 10 sends an HTTP status code 200 as the registration success notification, or an HTTP status code 500 as the registration error notification.

The document management server 10 and the client 30 execute a document registration event according to the processing procedure described above.

Figure 10:
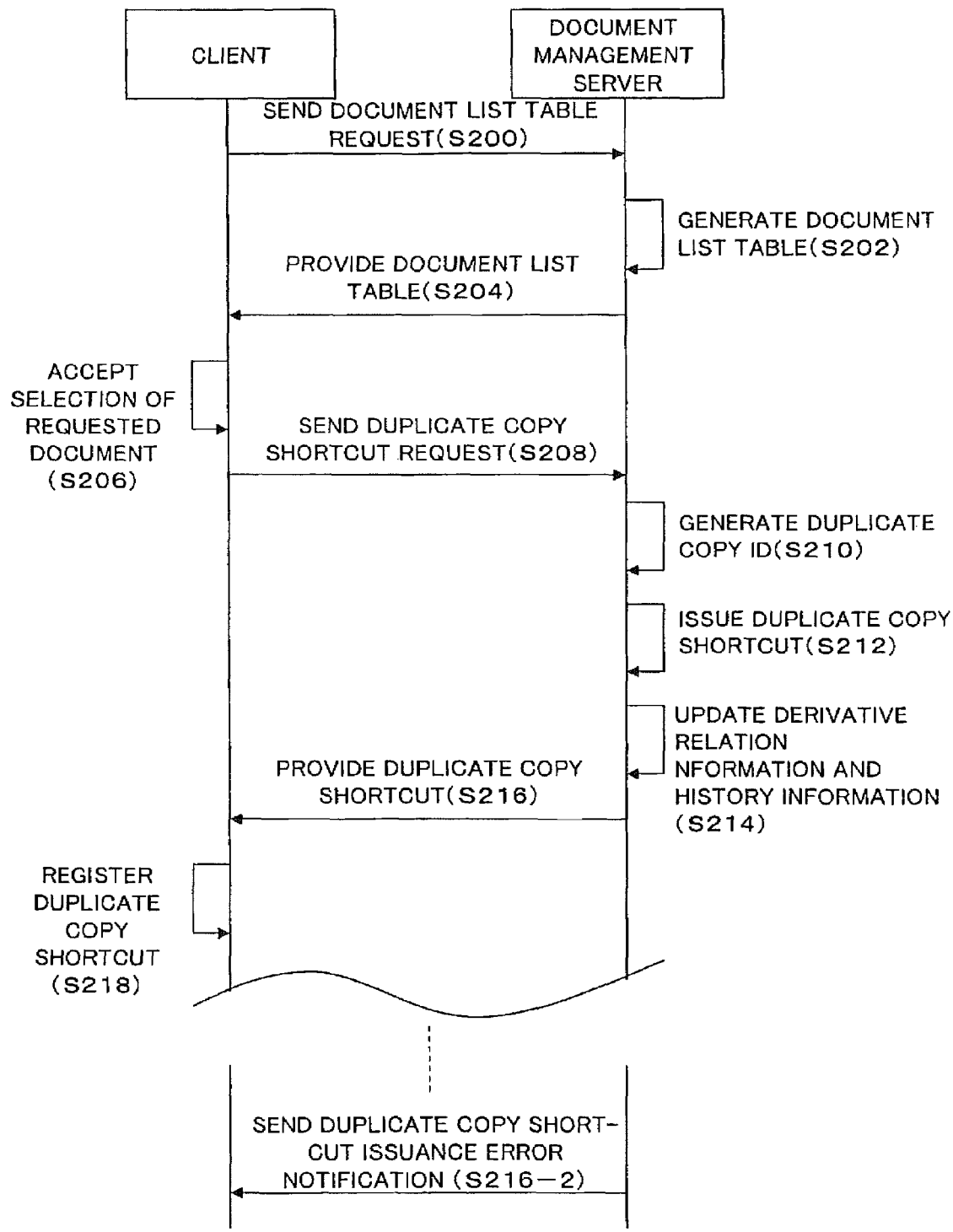
FIG. 10 is a diagram showing the processing procedure executed by the document management server and a client when a duplicate copy shortcut issuance event is executed.

Next, with reference to FIG. 10, the processing procedure carried out by the document management server 10 and the client 30 for executing a duplicate copy shortcut issuance event will be described.

First, the client 30 sends a document list table request to the document management server 10 (S200). In response to the request, the document management server 10 searches for the original copies available to the client 30 and, on the basis of the attributes of the documents included in the original copies found as the result of the search, generates a document list table such as that shown in FIG. 8 (S202). Subsequently, the document management server 10 provides the document list table to the client 30 (S204).

The client 30 displays the provided document list table on the screen and waits for a user to select a desired document. In response to a document selection from the user (S206), the client 30 sends a duplicate copy shortcut request, including the original copy ID of the selected document, to the document management server 10 (S208).

In response to the duplicate copy shortcut request, the document management server 10 generates a duplicate copy ID corresponding to the original copy ID included in the request (S210) and issues a duplicate copy shortcut including the duplicate copy ID, access site information, and the attribute of the duplicate copy shortcut (S212). In addition, the document management server 10 updates the derivative relation information and the history information (S214) and provides the issued duplicate copy shortcut to the client 30 (S216). If the issuance of the duplicate copy shortcut fails, the document management server 10 sends a duplicate copy shortcut issuance error notification to the client 30 (S216-2).

In response to the duplicate copy shortcut, the client 30 registers the duplicate copy shortcut in the duplicate copy shortcut storage unit 36 (S218).

The document management server 10 and the client 30 execute a duplicate copy shortcut issuance event according to the above-described processing procedure.

Figure 11:
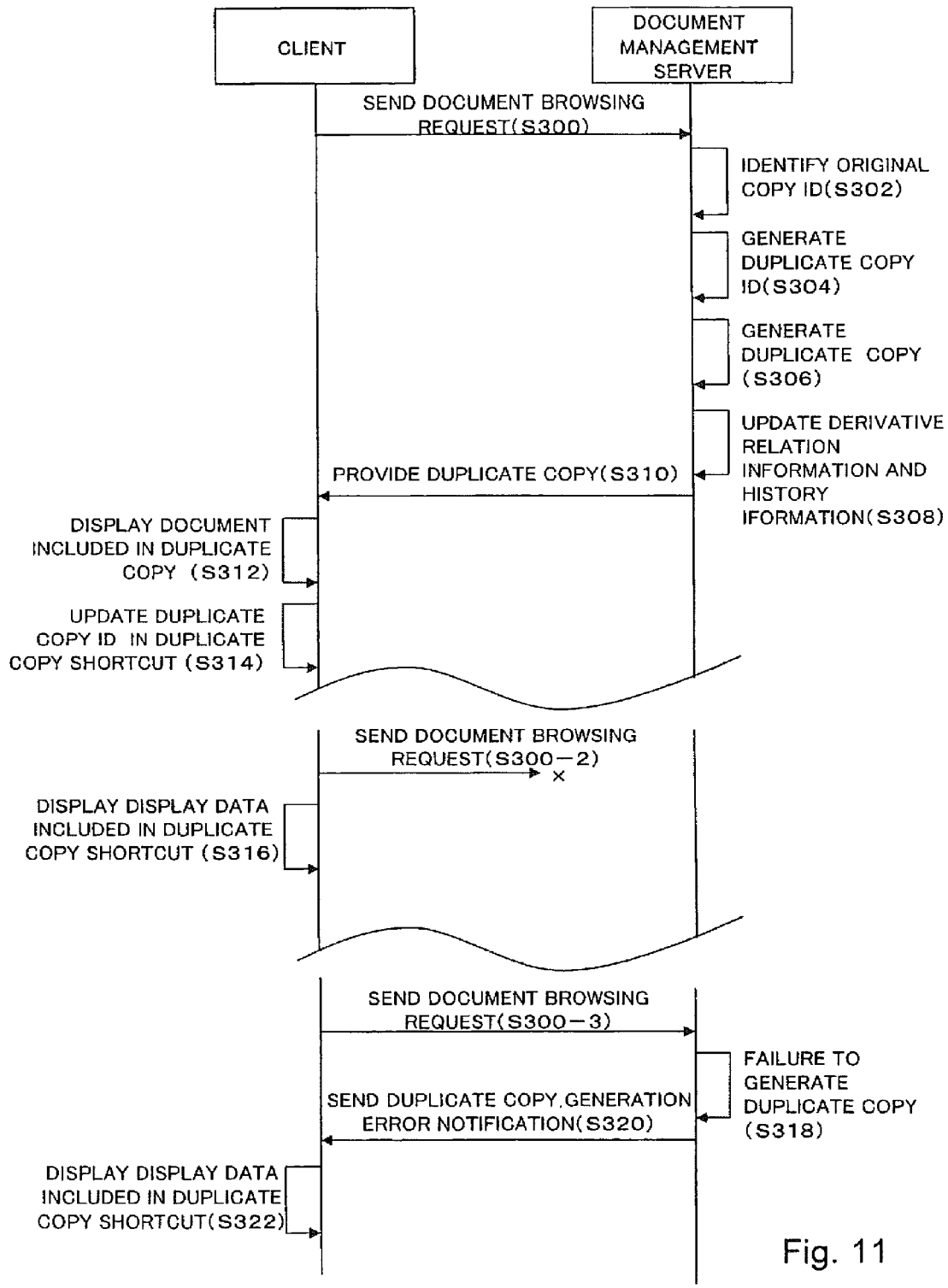
FIG. 11 is a diagram showing the processing procedure executed by the document management server and a client when a document provision event is executed.

Next, with reference to FIG. 11, the processing procedure carried out by the document management server 10 and the client 30 for executing a document provision event will be described.

First, the client 30 sends a document-browsing request to the document management server 10 (S300). That is, the client 30 obtains the access site information and the duplicate copy ID from the duplicate copy shortcut for the document to be browsed, and sends to the access site a document-browsing request, including the duplicate copy ID.

When the duplicate copy shortcut is a PDF file and the user opens the duplicate copy shortcut of a document to be browsed, a predetermined PDF plug-in is started to interpret the duplicate copy shortcut and reads the request URL and the duplicate copy ID from the duplicate copy shortcut. The PDF plug-in sends an HTTP request, specifying the duplicate copy ID, to the document management server 10 with the request URL specified.

The document management server 10 reads the duplicate copy ID from the received document-browsing request and references the duplicate copy ID and the derivative relation information to identify the original copy ID of the duplicate copy ID (S302). For example, assume that the document management server 10 reads the duplicate copy ID [3-1] from the document browsing request. The document management server 10 searches the derivative relation information for the derivative relation including the duplicate copy ID [3-1]. If the document management server 10 searches for the derivative relation, shown in FIG. 12, as the result of the search, the document management server 10 can identify that the original copy ID [0] is the original copy ID that is the root of the duplicate copy ID [3-1].

Next, the document management server 10 obtains the original copy corresponding to the original copy ID and generates a new duplicate copy ID (generated for updating) (S304). In addition, the document management server 10 generates a duplicate copy including the copied document of the document included in the original copy and the new duplicate copy ID (for updating) (S306). The document management server 10 also updates the derivative relation information and the history information (S308). Subsequently, the document management server 10 provides the duplicate copy to the client 30 (S310).

Upon receiving the duplicate copy, the client 30 displays on the screen the copied document included in the duplicate copy (S312) and, in addition, rewrites the duplicate copy ID of the duplicate copy shortcut specified for the document-browsing request to the duplicate copy ID (generated for updating) included in the duplicate copy (S314). If the duplicate copy ID in the duplicate copy shortcut is rewritten in this way each time the document is browsed, the document management server 10 that references the derivative relation information and the history information can manage when or how often which user has browsed which duplicate copy.

If the document management server 10 and the client 30 communicate with each other via HTTP, the document management server 10 returns a HTTP status code 200 (OK) in S310 and the client 30 displays on the screen the PDF document, which is sent as the body of the HTTP response. In this system, the displayed PDF document is processed only in the memory of the client 30 but is not output to a file even temporarily. The client 30 can print, but cannot save the file displayed on the client 30, or edit the displayed document.

Next, the processing executed when the client 30 that has issued a document-browsing request cannot obtain a duplicate copy from the document management server 10 will be described.

First, assume that the client 30 sends a document-browsing request to the document management server 10 but, because of a network error, the document-browsing request cannot reach the document management server 10 (S300-2). In this case, the client 30 displays on the screen display data included in the duplicate copy shortcut specified for the document-browsing request (S316). In addition, an error message indicating that the document cannot be browsed may also be displayed on the screen, by use of, for example, a dialog. The display data that are displayed in this case can be generated in conjunction with the duplicate copy ID and included in the duplicate copy shortcut when the document management server 10 issues the duplicate copy shortcut.

Next, assume that a document-browsing request sent by the client 30 successfully reaches the document management server 10 (S300-3) but the document management server 10 fails to generate a duplicate copy for that request (S318). A duplicate copy sometimes cannot be generated, because the user authentication of the client 30 fails or the original copy does not already exist in the document management server 10.

If for some reason the duplicate copy cannot be created; for example, for any of those reasons described above, the document management server 10 sends a duplicate copy generation error notification to the client 30 (S320). When the client 30 and the document management server 10 communicate with each other via HTTP, the document management server 10 sends an HTTP status code 304 (Not Modified), an HTTP status code 4xx, or an HTTP status code 5xx. In this case as well, the client 30 displays on the screen display data included in the duplicate copy shortcut used for the document-browsing request (S322).

As described above, the document management server 10 in this embodiment generates a unique duplicate copy ID for each duplicate copy shortcut request from the client 30 even if the same original copy is requested, and provides a duplicate copy shortcut, including the duplicate copy ID, to the client 30. In addition, the document management server 10 updates the derivative relation information and the history information each time it generates a duplicate copy ID.

The document management server 10 references the derivative relation information to identify an original copy ID corresponding to a duplicate copy ID. Therefore, on the basis of the duplicate copy ID specified for a document-browsing request received from the client 30, the document management server 10 can identify the original copy to be browsed and provide the copy of a document, included in the original copy, to the client 30.

The document management server 10 can reference the derivative relation information and the history information to keep track of which user has issued a duplicate copy shortcut to which original copy. Even when a user copies a duplicate copy shortcut provided to that user and distributes the same to another user by mail and, subsequently, if the user who receives the copied duplicate copy shortcut uses it to send a document-browsing request to the document management server 10, the document management server 10 can identify the user, to which the duplicate copy shortcut corresponding to the duplicate copy ID was provided, on the basis of the duplicate copy ID included in the request. That is, the document management server 10 can identify which user copied the duplicate copy shortcut and distributed it to another user.

The method described above will now be described with reference to derivative relation information shown in FIG. 12 and history information shown in FIG. 13.

Figure 12:
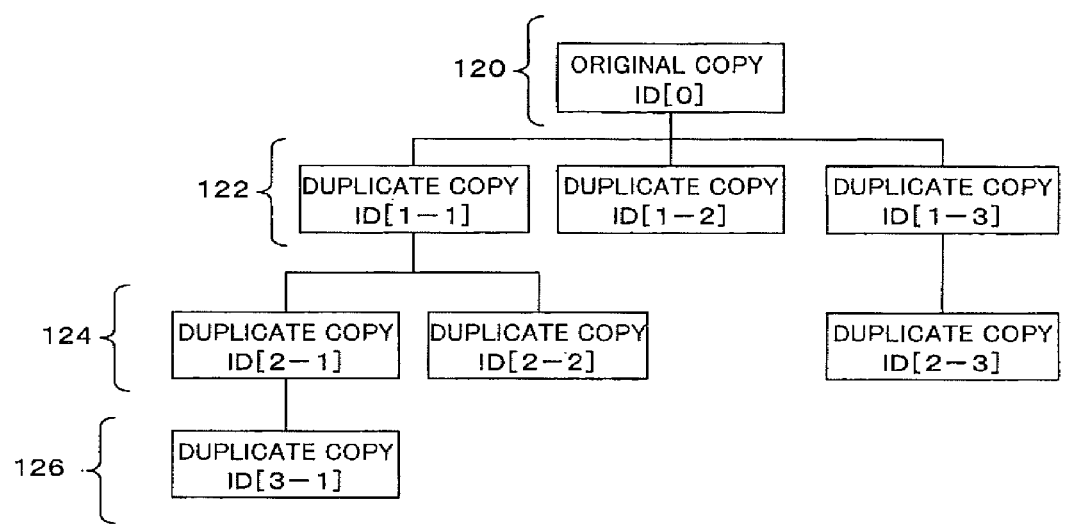
FIG. 12 is a diagram showing an example of tree structure data indicating the derivative relation of an original copy ID and duplicate copy IDs.

First, as shown in FIG. 12, a first hierarchical level 122 has three duplicate copy IDs that are children of the original copy ID [0]. This indicates that three duplicate copy shortcuts are generated from the original copy ID [0]. FIG. 13 indicates that the user ID, to which the duplicate copy ID [1-1] has been provided, is user ID [abc02].

In addition, a second hierarchical level 124 includes two duplicate copy IDs that are children of the duplicate copy ID [1-1]. The duplicate copy ID is updated each time the document is browsed by use of the duplicate copy shortcut including the duplicate copy ID [1-1] and therefore, in this case, the presence of the two duplicate copy IDs indicates that the document has been browsed twice by use of the duplicate copy shortcut including the duplicate copy ID [1-1]. That is, this second hierarchical level indicates that the duplicate copy shortcut including the duplicate copy ID [1-1] has been copied at least once.

In addition, the history information shown in FIG. 13 indicates that the user IDs corresponding to the duplicate copy ID [2-1] and duplicate copy ID [2-2] in the second hierarchical level are user ID [abc14] and user ID [abc15], respectively. Therefore, the information indicates that the duplicate copy shortcut provided to the user ID [abc02] has been copied and distributed to at least user ID [abc14] and user ID [abc15] for browsing the copied document of the original copy ID [0].

In addition, the derivative relation shown in FIG. 12 indicates that the duplicate copy ID [3-1], which is the child of the duplicate copy ID [2-1], is in a third hierarchical level 126. This relation indicates that still another browsing request has been issued by use of the duplicate copy shortcut whose duplicate copy ID was updated by the browsing by the user ID [abc14]. In this case, if the history information shows that the user ID who browsed the document using the duplicate copy shortcut including the duplicate copy ID [2-1] is not the user ID [abc14], this indicates that the user ID [abc14] further copied the duplicate copy shortcut and distributed it to a third party and that the third party, who received the distributed duplicate copy shortcut, used the duplicate copy shortcut to browse the copied document of the original copy ID [0].

As described above, the derivative relation information in this embodiment shows how many duplicate copy shortcuts have been issued to an original copy by the document management server 10. The derivative relation information also shows how many times a document has been browsed by use of an issued duplicate copy shortcut. In addition, the derivative relation information, if referenced with the history information, shows which user has browsed a document using a duplicate copy shortcut issued to which user. When a user browses a document using a duplicate copy shortcut, the duplicate copy ID included in the duplicate copy shortcut is updated. Therefore, when a user has provided a duplicate copy shortcut to another user, whether the user browsed the document using the duplicate copy shortcut before providing the duplicate copy shortcut to the other user can be checked by checking whether the duplicate copy ID in the duplicate copy shortcut is updated.

Furthermore, access to an original copy managed by the document management server 10 can be limited as follows by adding special information to the derivative relation information and the history information managed by the document management server 10.

That is, in this system, for each created duplicate copy shortcut, a limitation can be imposed on users who can browse the document using the duplicate copy shortcut. For example, when a duplicate copy shortcut request is accepted from the client 30, the document management server 10 requests the client 30 to specify the user IDs who are allowed to browse the document using the duplicate copy shortcut. The document management server 10 associates the user IDs, specified by the client 30 as browsing users, with the duplicate copy ID and stores them. Subsequently, when a document-browsing request is received from the client 30, the document management server 10 checks if the user ID of the client 30 matches one of browsing user IDs associated with the duplicate copy ID specified by the document-browsing request, so as to determine whether to provide the duplicate copy to the client 30. Therefore, even if the duplicate copy shortcut is copied illegally and is distributed to a third party, this method provides the duplicate copy only to previously registered browsing users, thus protecting the contents of the document. The document management server 10 can also manage the browsing status of the browsing users and, after all browsing users have browsed the document, inhibits reading of the document.

Furthermore, the document management server 10 may accept a browsing permission period associated with a duplicate copy shortcut from the client 30 at a duplicate copy shortcut request time and store the accepted browsing permission period in conjunction with the duplicate copy ID. Using this information, the document management server 10 can limit the period during which the document can be browsed by use of the duplicate copy shortcut.

In addition, the document management server 10 can limit the number of times a document is browsed by each duplicate copy shortcut. For example, upon receiving a duplicate copy shortcut request from the client 30, the document management server 10 requests the client 30 to specify the threshold number of times the document can be browsed by use of the duplicate copy shortcut. The document management server 10 associates the threshold number of times, specified by the client 30, with the duplicate copy ID and stores them. Each time a document-browsing request is issued, the document management server 10 counts the number of occurrences of the duplicate copy ID specified for the request. Once the number of occurrences reaches the threshold number of times allocated to the duplicate copy ID, the document management server 10 does not allow the duplicate copy to be provided to a document-browsing request for which the duplicate copy ID is specified. This method allows the document management server 10 to limit the number of times the document can be browsed for each duplicate copy shortcut.

In this system, the document management server 10 may authenticate the user each time an event is executed or may authenticate the user only when a duplicate copy shortcut issuance event is executed.

In this system, when printing a copied document included in a duplicate copy provided from the document management server 10, the client 30 can print the duplicate copy ID included in the duplicate copy in a predetermined location (for example, in the header) at the same time the client 30 prints the contents of the document. The duplicate copy ID may be printed visibly or may be printed on the back side of the document as a hidden character string so that the duplicate copy ID becomes visible when the printed matter is copied by a copier.

In the example shown in the embodiment described above, the document management server 10 issues a duplicate copy shortcut, including access site information, and provides it to the client 30. Alternatively, if access site information is registered in the client 30 in advance, the document management server 10 can issue to the client 30 a duplicate copy shortcut, which does not include access site information. For example, if the duplicate copy shortcut is a PDF file, access site information is described in advance in the setting file of the PDF plug-in in the client 30 so that, when the PDF plug-in is started, the PDF plug-in can read the access site information from the setting file.

In the example shown in the embodiment described above, the document management server 10 generates an original copy ID or a duplicate copy ID during event execution. Alternatively, the client 30 can generate an original copy ID or a duplicate copy ID during event execution. An original copy ID or a duplicate copy ID generated by the client 30 may be generated by the random number calculation method or the hash calculation method used by the document management server 10. If an original copy ID or a duplicate copy ID generated by the client 30 is not unique, the document management server 10 can request the client 30 to re-generate an original copy ID or a duplicate copy ID in order to prevent the registration of duplicate original copy IDs or duplicate copy IDs. An original copy ID or a duplicate copy ID generated by the client 30 is included in a document registration request, a duplicate copy shortcut request, or a document-browsing request and is provided to the document management server 10. The document management server 10 uses the provided original copy ID or duplicate copy ID to update the derivative relation information.

In the example shown in the embodiment described above, the document management server 10 provides a duplicate copy shortcut, which does not include the entity of a document, to the client 30 and, each time the client 30 issues a browsing request, provides a copied document to the client 30. Alternatively, the document management server 10 may accept a duplicate copy request, rather than a duplicate copy shortcut request, from the client 30; generate a unique duplicate copy ID for each duplicate copy request; and provide to the client 30 a duplicate copy, composed of the duplicate copy ID and the copied document. This method allows the client 30 to browse the copied document even if the client 30 is in the offline state in which it cannot communicate with the document management server 10. In this case, the client 30 should preferably generate and update a duplicate copy ID each time it browses the duplicate copy. In this case, the client 30 also manages the derivative relation information independently and, when the state is changed to the online state in which the client 30 can communicate with the document management server 10, provides the derivative relation information to the document management server 10. The document management server 10 updates its own derivative relation information on the basis of the derivative relation information provided to the client 30. This enables the document management server 10 to manage document browsing.

In this embodiment, a duplicate copy shortcut is a PDF file not including the entity of a document. Note that a duplicate copy shortcut may include any subordinate data, so long as it is not the entity of the original copy. For example, a duplicate copy shortcut that includes a part of the original copy document, such as the table of contents or the cover page, could also achieve an effect equivalent to that of the present invention described above. A duplicate copy shortcut may include not only a part of the original copy document, but also data obtained by processing the original copy. Such data includes a thumbnail image or the abstract of the original copy. Such subordinate data, if included in a duplicate copy shortcut, would allow the client 30 to display the subordinate data when the client 30 fails to communicate with the document management server 10. Even in the absence of the plug-in that can interpret the duplicate copy shortcut, the client 30 can display the subordinate data. In this case, the client 30 can browse the subordinate data in order to determine the best action to take next.

Next, a first modification of the embodiment will be described below with reference to the drawings.

Figure 14:
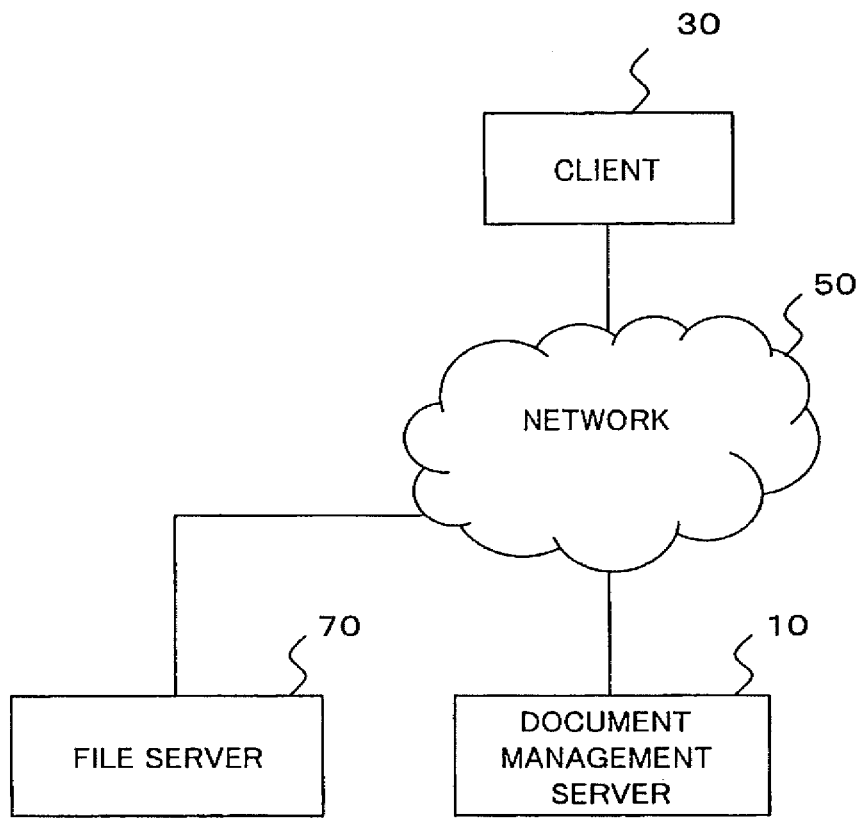
FIG. 14 is a diagram showing the general configuration of a document management system of a first modification.

FIG. 14 is a diagram showing the general configuration of a document management system of the first modification. The first modification differs from the embodiment described above in that a file server 70 is added. In the system in the first modification, a document management server 10 manages documents, which have been managed by the file server 70, according to an instruction from a client 30 on behalf of the file server 70. The file server 70 manages duplicate copy shortcuts instead of documents.

Figure 15:
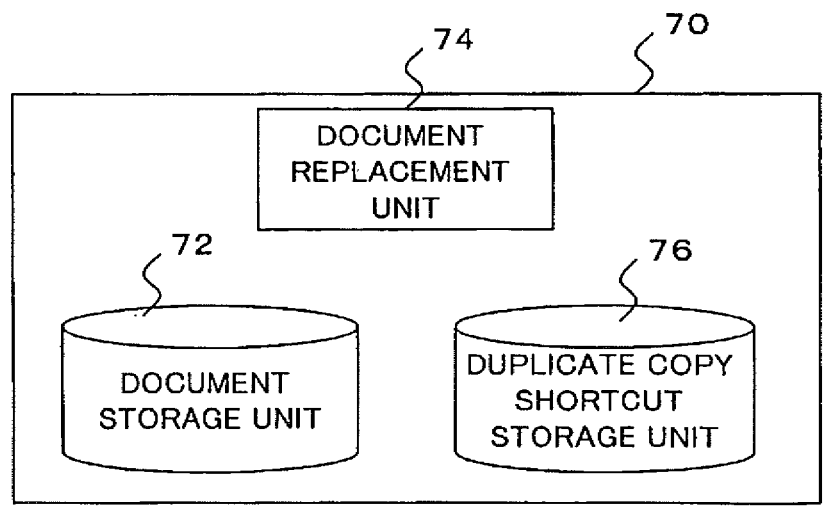
FIG. 15 is a functional block diagram of a file server of the first modification.

FIG. 15 is a functional block diagram of the file server 70. A document storage unit 72 stores documents with the attributes associated therewith. A document replacement unit 74 registers a document, which is selected by the client 30 from the documents stored in the document storage unit 72, into the document management server 10 as an original copy. The document replacement unit 74 also receives a duplicate copy shortcut, corresponding to the registered original copy, from the document management server 10 and registers it in a duplicate copy shortcut storage unit 76. The duplicate copy shortcut storage unit 76 stores duplicate copy shortcuts provided from the document management server 10.

Figure 16:
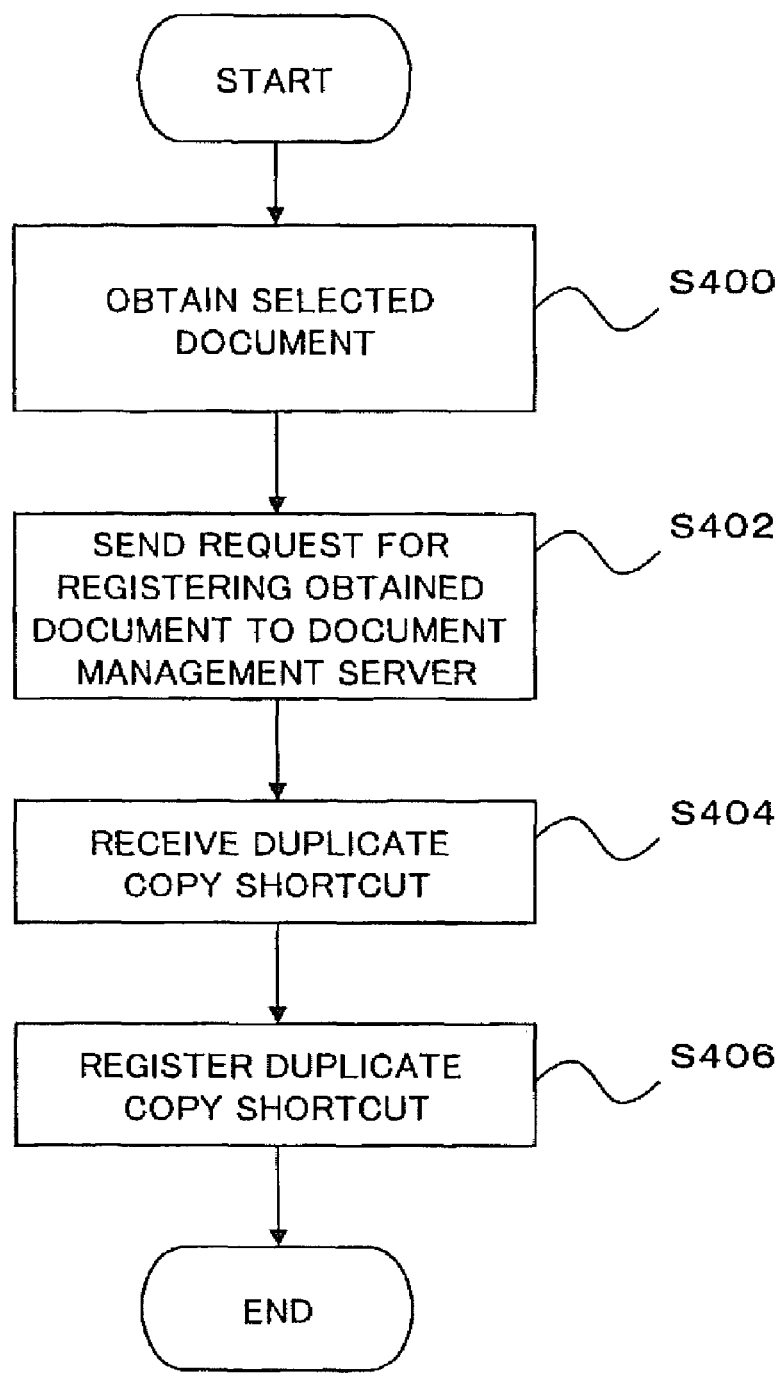
FIG. 16 is a flowchart showing the processing procedure for document replacement executed by a document replacement unit.

The following describes, with reference to the flowchart shown in FIG. 16, the processing procedure for document replacement executed by the document replacement unit 74 Fig.

The document replacement unit 74 obtains from the document storage unit 72 a document selected by the client 30 and the attribute of the document (S400). More specifically, the document replacement unit 74 provides to the client 30 a document selection screen such as that shown in FIG. 17. That is, the document replacement unit 74 provides a list of documents that are stored in the document storage unit 72 and that can be registered in the document management server 10. On the document selection screen, the user presses a registration button 140 corresponding to a document to be replaced or checks checkboxes 142 corresponding to one or more documents to be replaced and then presses a group registration button 144. The client 30 presses the registration button 140 or the group registration button 144 to send identification information, such as document file names, to the document replacement unit 74. In response to the received identification information, the document replacement unit 74 obtains the document (s), selected by the client 30, and the attributes thereof from the document storage unit 72.

Next, the document replacement unit 74 sends to the document management server 10 a document registration request, including the document and the attribute of the document (S402). In response to the document registration request, the document management server 10 issues a duplicate copy shortcut as in the embodiment described above and sends it to the file server 70. After that, the document replacement unit 74 receives the duplicate copy shortcut from the document management server 10 (S404) and registers it in the duplicate copy shortcut storage unit 76 (S406).

In this way, a document that has been managed by the file server 70 is managed by the document management server 10 as an original copy. The file server 70 manages the duplicate copy shortcut of a document instead of the document itself. The client 30 can download a duplicate copy shortcut, managed by the file server 70, to browse the document by use of the duplicate copy shortcut as in the embodiment described above.

In the first modification, the client 30 downloads a file from the file server 70 without worrying about whether the file managed by the file server 70 is a duplicate copy shortcut. When the client 30 opens the downloaded file, the client 30 automatically accesses the document management server 10, and the document corresponding to the duplicate copy shortcut is displayed on the screen.

The document management server 10 can also manage the duplicate copy shortcuts managed by the file server 70; that is, the file server 70 can manage which user uses a duplicate copy shortcut, provided to the file server 70, for browsing a document.

In response to a request for a duplicate copy shortcut from the client 30, the file server 70 can also return a second duplicate copy shortcut instead of the duplicate copy shortcut. To do so, the client 30 obtains the duplicate copy ID from the duplicate copy shortcut, generates a second duplicate copy shortcut including a new second duplicate copy ID according to the method described in the above-described embodiment, and returns it to the client. Generating a second duplicate copy shortcut allows the client 30 to obtain a duplicate copy shortcut including a different duplicate copy ID each time the client 30 obtains a duplicate copy shortcut, thus producing more-detailed derivative relation recording. Although a new duplicate copy shortcut is generated at the time the duplicate copy shortcut is obtained in the above description in order to generate more-detailed derivative relation information, the duplicate copy shortcut managed by the file server 70 may also be replaced by the new second shortcut after the client 30 has obtained the duplicate copy shortcut. In addition, if a duplicate copy shortcut is downloaded a predetermined number of times, the duplicate copy shortcut may also be replaced by a new duplicate copy shortcut or may be replaced after a predetermined time has elapsed; that is, on a regular basis.

In the example described above, a document managed by the file server 70 is registered in the document management server 10 as an original copy. It is also possible that, when a request to register a new document is sent from the client 30 to the file server 70, the document management server 10 manages the document as an original copy and the file server 70 manages the duplicate copy shortcut of the original copy.

Next, a second modification of the embodiment will be described below with reference to the drawings.

Figure 18A:
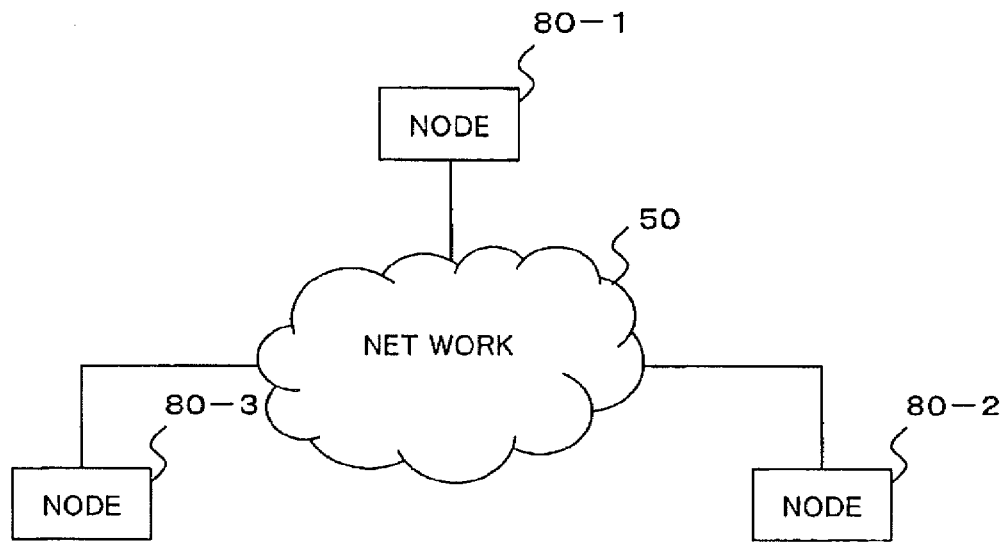
FIG. 18A is a diagram showing the general configuration of a document management system of a second modification of the embodiment.

FIG. 18A is a diagram showing the general configuration of a document management system of the second modification. The document management system of the second modification is configured as a so-called pure P2P (Peer-to-Peer) network. Nodes 80-1, 80-2, 80-3, and so on configured in this way (hereinafter generally called "node 80" in cases where they need not be identified individually) do not act simply as a document management server 10 or as a client 30, but act as both of these devices. They are distributed for managing objects such as documents.

In the embodiments described above, the client 30 requests the document management server 10 to send a duplicate copy shortcut corresponding to an original copy that is one of the original copies registered in the document management server 10 in advance and that is specified by the requesting user. By contrast, in the second modification, the node 80 also receives the specification of browsing users from the requesting user when the node 80 registers a new document and issues duplicate copy shortcuts to the browsing users when the node 80 registers the new document to provide the duplicate copy shortcuts to the browsing users. In other words, in the second modification, it is not the case that each node 80 searches the registered documents for a document whose duplicate copy shortcut is to be issued. More precisely, in the second modification, if there are users to which a duplicate copy shortcut is to be issued for allowing them to browse a document, a user registers a document to be browsed in the node and, at the same time, requests the node to issue a duplicate copy shortcut and distribute the duplicate copy shortcut to the browsing users.

In this system, a Chord algorithm, which is a type of so-called distributed hash table, is used. The nodes register an object in a node in accordance with the hash value of the object and transfers objects among the nodes. (Reference: Ion Stoica, Robert Morris, David Karger, M. Frans Kaashoek, and Hari Balakrishnan, Chord: A Scalable Peer-to-Peer Lookup Service for Internet Applications, ACM SIGCOMM 2001, San Diego, Calif., August 2001, pp. 149-160).

Figure 18B:
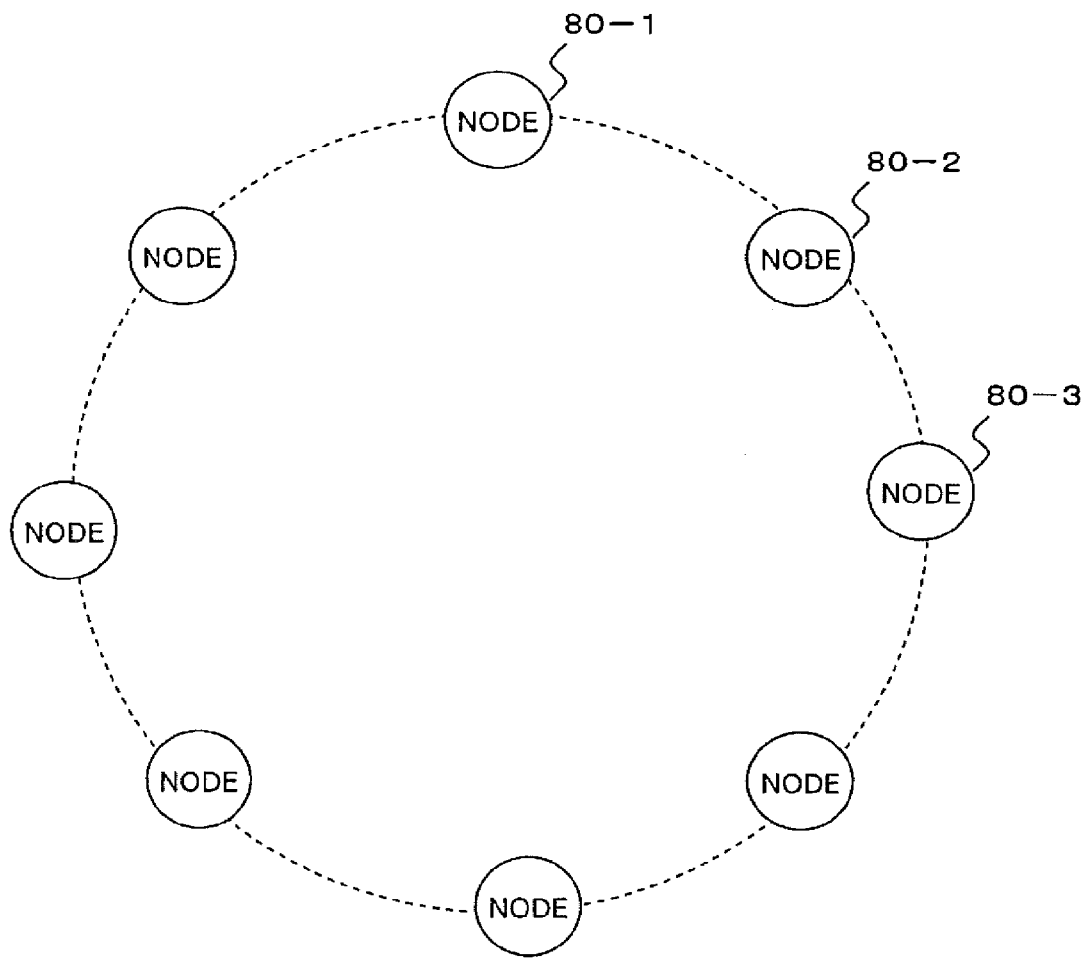
FIG. 18B is a diagram showing a network configured by Chord, which is a hash table.

The node 80 has a node ID that is a hash value generated by calculating node-specific data (IP address in this system) by means of a known hash function. In this system, SHA-256 is used as the known hash function. In the below description, SHA-256 is used also for the calculation of a hash value for other data. A hash value is also allocated to each object as a unique ID. In this system configured according to Chord, the entire network is defined as a circular virtual space called an ID circle (Identifier Circle) as shown in FIG. 18B with all nodes 80 and all objects allocated on the ID circle.

The node 80, to which a hash space corresponding to the node ID is allocated, has objects each having a hash value included in the hash space. The node 80 also has a list of unique IDs of the objects owned by the node, routing information (a so-called finger table), and information on the neighboring nodes. The routing information contains information on the next node to which an inquiry is to be forwarded (sent) when a desired object is not found in the node as a result of a search for an object.

When a node attempts to register an object in this system but the unique ID of the object to be registered is not included in the hash space allocated to the node itself, the node references the routing information to determine the next node to which an inquiry is to be forwarded and sends the object to be registered to that node. An object can be registered in a node by repeating the sequence of this determination processing. Similarly, when a node attempts to obtain an object but the unique ID of the object to be obtained is not registered in the list, the node determines the next node to which an inquiry is to be forwarded and sends the inquiry to that node. The node repeats this sequence of determination processing to search for a node in which the object to be obtained is stored and obtains that object from the node which it has found as a result of the search.

Figure 19:
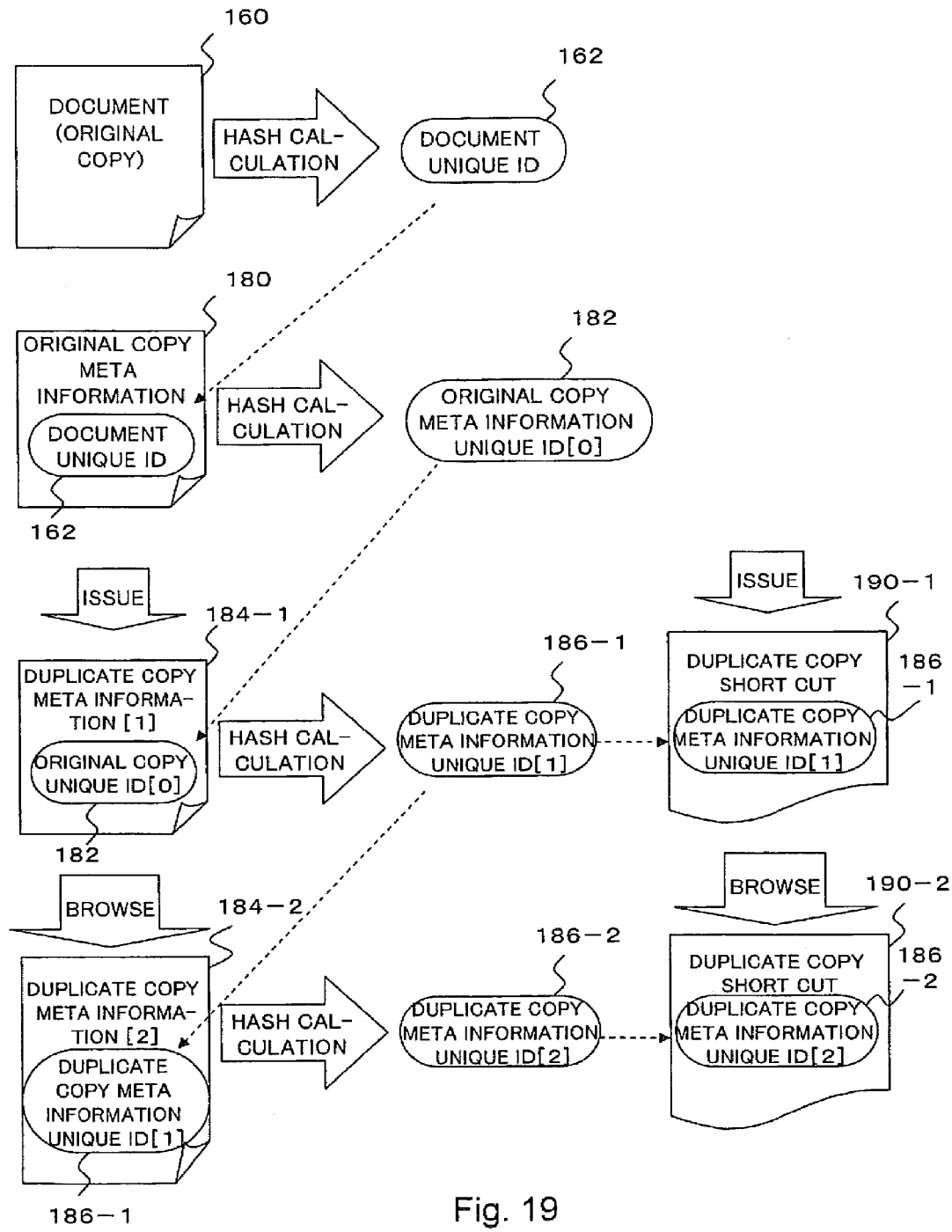
FIG. 19 is a diagram showing the objects stored in the nodes in the second modification.

In this system, an object held in the node 80 includes, as shown in FIG. 19, a document 160, original copy meta information 180, and duplicate copy meta information 184.

The document 160 is data of byte strings, and a hash value generated by performing the hash calculation for the document 160 is a unique ID 162 of the document.

The original copy meta information 180, which is an XML document describing the attribute of the document, describes the unique ID 162 of the document and other information. The node 80 references the unique ID included in the original copy meta information; that is, the hash value of the document, to identify the node in which the document corresponding to the original copy meta information is stored. A hash value obtained by performing the hash calculation for the original copy meta information 180 is a unique ID 182 of the original copy meta information.

The duplicate copy meta information 184 is an XML document generated each time the node 80 issues a duplicate copy shortcut 190. The duplicate copy meta information is also generated each time the copied document is browsed by use of the duplicate copy shortcut 190. A unique ID 186 of the duplicate copy meta information corresponds to a duplicate copy ID. A hash value generated by performing the hash calculation for the duplicate copy meta information is the unique ID 186 of the duplicate copy meta information.

The node 80 uses a unique ID 186-1 for the duplicate copy ID of a duplicate copy shortcut 190-1 that is issued by the node 80, and a unique ID 186-2 for the duplicate copy ID (for updating) of a duplicate copy shortcut 190-2 used for browsing.

FIG. 20A shows an example of the data structure of original copy meta information. In FIG. 20A, a tag 200 indicates that this XML document includes original copy meta information. The element indicated by a tag 202 describes the file name of a document associated with the original copy meta information. The element indicated by a tag 204 describes the file format of the document. The element indicated by a tag 206 describes the name of the user (user ID) who created the document. The element indicated by a tag 208 describes the creation date and time of the document. The element indicated by a tag 210 describes the hash value (unique ID) of the document.

FIG. 20B shows an example of the data structure of duplicate copy meta information. In FIG. 20B, a tag 300 indicates that this XML document includes duplicate copy meta information. The element indicated by a tag 302 describes the name of a user who issued the duplicate copy shortcut or who browsed the document using the duplicate copy shortcut. The element indicated by a tag 304 describes the date and time at which the duplicate copy shortcut was issued or the date and time at which the user browsed the copied document using the duplicate copy shortcut. The element indicated by a tag 306 describes the unique ID of the original copy meta information when the duplicate copy meta information was generated when the duplicate copy shortcut was generated. Meanwhile, when the duplicate copy meta information is duplicate copy meta information generated when the user browsed the copied document using the duplicate copy shortcut, this element describes the unique ID (duplicate copy ID) included in the duplicate copy shortcut.

Figures 21A, 21B:
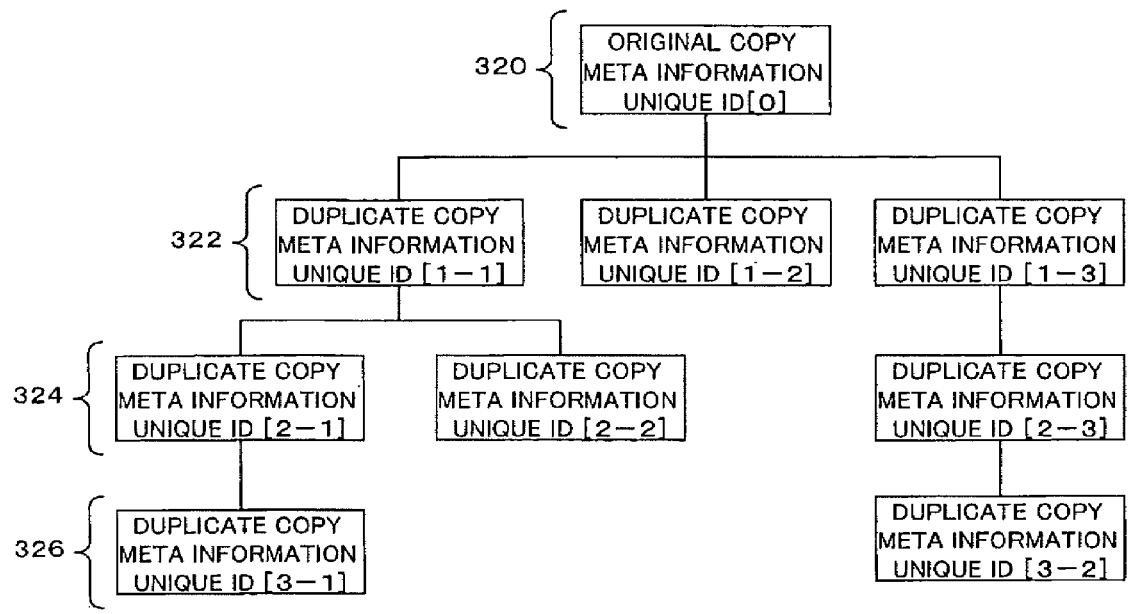
FIG. 21A is a diagram showing an example of tree structure data indicating the derivative relation of original copy meta information and duplicate copy meta information.
FIG. 21B is a diagram showing an example of the data configuration of history information managed by a node.

The node 80 maintains and manages the derivative relation information indicating the derivative relation of the original copy meta information owned by itself as well as the history information on the original copy meta information. FIG. 21A is a diagram showing the derivative relation built by this system. FIG. 21B shows an example of the data configuration of the history information managed by the node 80. As shown in FIG. 21B, the node 80 associates the duplicate copy ID of a duplicate copy shortcut (that is, the unique ID of duplicate copy meta information) issued to original copy meta information stored in itself with the user ID (for example, mail address) of a user to which the duplicate copy shortcut was issued and manages these as the history information. This information indicates to which user the duplicate copy shortcut, used when a user browsed the document, was provided.

In this system, when a new document is registered, the node 80 accepts the specification of browsing users of the document from the user. The node 80 issues duplicate copy shortcuts, one for each specified user, and sends a duplicate copy shortcut to each browsing user by, for example, e-mail.

Figure 22:
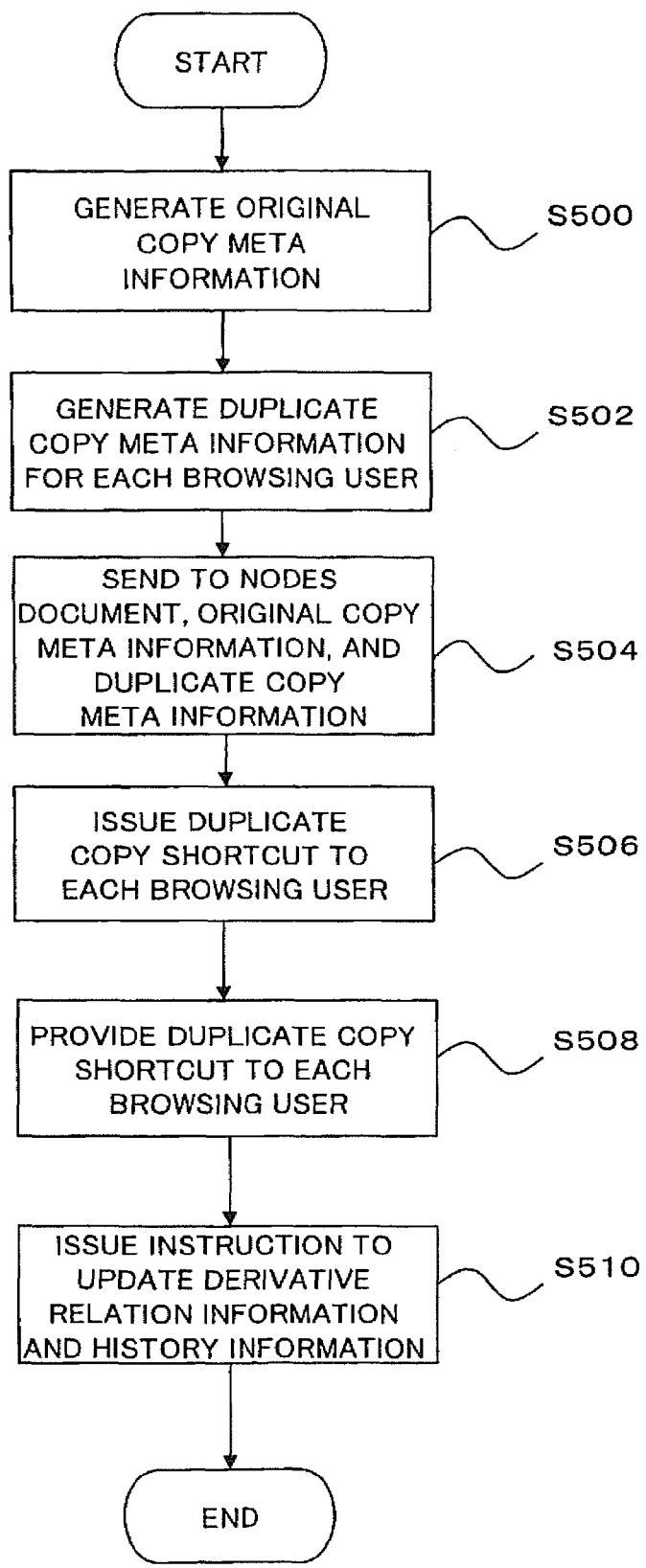
FIG. 22 is a flowchart showing the processing procedure executed by a node in the second modification for registering a new document and providing to browsing users a duplicate copy shortcut, corresponding to the document.

With reference to the flowchart shown in FIG. 22, the processing procedure executed by the node 80 for registering a new document and providing the duplicate copy shortcut corresponding to the document to browsing users will be described.

In response to a request from a user for registering a new document, the node 80 generates the original copy meta information on the document (S500) and, in addition, generates duplicate copy meta information for each browsing user specified by the request-issuing user when the registration request was issued (S502). Next, the node 80 calculates the hash values; that is, the unique IDs, of the document, the original copy meta information, and the duplicate copy meta information (hereinafter, original copy meta information and duplicate copy meta information are collectively called "meta information" where they do not need to be distinguished). On the basis of the calculated unique IDs, the node 80 searches for the nodes where the document and the meta information are to be stored and sends the meta information to the nodes that have been found (S504). Depending upon the values of the unique IDs, the node 80 may in some cases store the document or any of the meta information.

In addition, the node 80 issues the duplicate copy shortcuts for the document to be registered, one for each browsing user (S506). The duplicate copy ID of a duplicate copy shortcut generated in this step is the unique ID (hash value) of duplicate copy meta information generated for each browsing user. Next, the node 80 provides the issued duplicate copy shortcuts to the browsing users (S508). Furthermore, the node 80 instructs the node, where the original copy meta information is stored, to update the derivative relation information and the history information (S510). The node that receives the update instruction registers into the derivative relation information tree structure data, composed of a parent that is the unique ID of the original copy meta information and a child that is the unique ID of the duplicate copy meta information. The node also associates the unique ID of the duplicate copy meta information with the respective browsing user IDs and registers them in the history information.

After the processing procedure described above is executed, the new document and the original copy meta information on the document are registered in any of the nodes. In addition, duplicate copy meta information on the document is also generated for each browsing user specified by the user, who issued the registration request, and is stored in any of the nodes. And, a duplicate copy shortcut whose duplicate copy ID is the unique ID of generated duplicate copy meta information is issued and sent to each browsing user.

Figure 23:
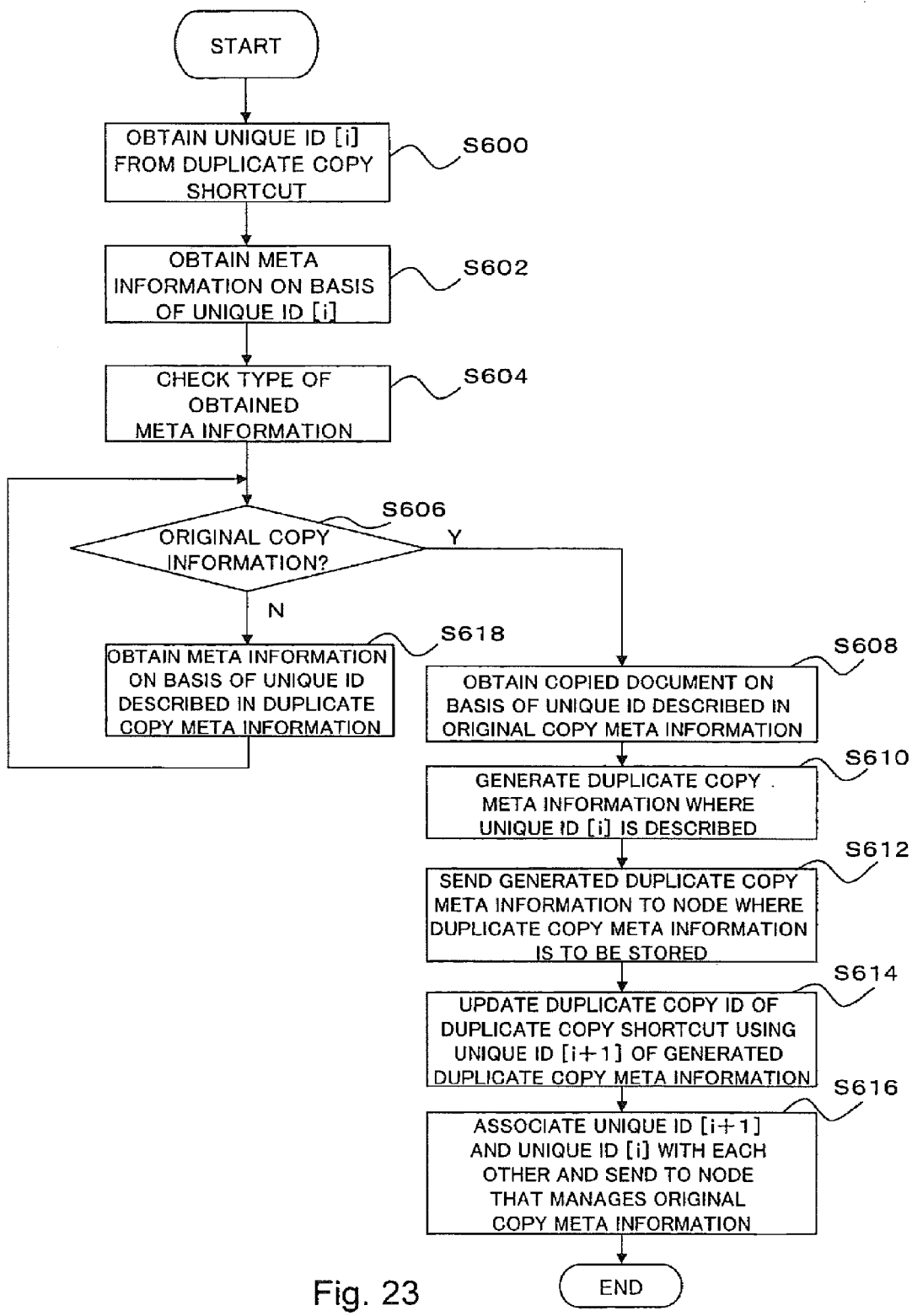
FIG. 23 is a flowchart showing the processing procedure executed by a node in the second modification for browsing a document using a duplicate copy shortcut.

With reference to the flowchart shown in FIG. 23, the processing procedure executed by the node 80 for browsing a document using a duplicate copy shortcut will be described.

The node 80 obtains the unique ID [i] from the duplicate copy shortcut selected by the user for browsing (S600), searches for the node where meta information corresponding to the unique ID [i] is stored, and obtains meta information from the node that has been found as the result of search (S602). Next, the node 80 checks if the obtained meta information is original copy meta information or duplicate copy meta information (S604). If the result of checking shows that the meta information is original copy meta information (Y in S606), the node 80 searches for the node where the document corresponding to the original copy meta information is stored as the original copy on the basis of the unique ID included in the original copy meta information, and obtains a copy of the document to be browsed from the node that has been found as a result of search (S608). The node 80 displays the obtained copied document on the screen (S608).

Next, when the node 80 browses the document, the node 80 generates new duplicate copy meta information in which the unique ID [i] is described in the tag where the hash value is described (S610). In addition, the node 80 calculates the hash value of the new duplicate copy meta information, searches for the node where the new duplicate copy meta information is to be stored, using the calculated hash value as the unique ID [i+1] of the new duplicate copy meta information, and sends the new duplicate copy meta information to the node that has been found as the result of search (S612). The node 80 updates the duplicate copy ID of the duplicate copy shortcut, used for document browsing, with the unique ID [i+1] (S614). That is, the node 80 changes the duplicate copy ID of the duplicate copy shortcut to the unique ID [i+1]. Furthermore, the node 80 associates the unique ID [i+1] with the unique ID [i] and sends those unique IDs to the node 80 where the original copy meta information on the document to be browsed is stored (S616). In response to the notification of the unique IDs, the node updates the derivative relation information it owns. That is, the node adds the unique ID [i+1] as a child of the unique ID [i].

On the other hand, if the type of the obtained meta information that is checked in S604 is duplicate copy meta information (N in S606), the node 80 searches for a node that includes the meta information corresponding to the unique ID described in the obtained meta information, obtains new meta information from the node that is found as the result of search (S618), and again checks the type in S606. The node 80 repeats this processing to obtain the original copy meta information.

As described above, the nodes 80 in the second embodiment are not distinguished clearly as the document management server 10 or the client 30, but act as both to perform distributed management of objects such as documents. The derivative relation information and the duplicate copy meta information show which user has issued a duplicate copy shortcut, which user has browsed a document, and when the user browsed it. The history information, if referenced with the derivative relation information and the duplicate copy meta information, shows which user has issued a duplicate copy shortcut and when the user issued it. In addition, the derivative relation information managed by each node shows how many duplicate copy shortcuts have been issued for a document, which duplicate copy shortcut was used to browse the document, and how many times the document has been browsed.

There may also be employed a simpler configuration in which a node does not store the derivative relation information or the history information on original copy meta information and, when duplicate copy meta information is generated, no notification is sent to the node that stores the original copy meta information. Even in such a simpler configuration, the history information, to which the given duplicate copy shortcut is propagated, can be restored by recursively referencing meta information.

In one embodiment of the present invention, the document management server further comprises a document-providing unit that receives an access request for a document, identifies an original copy ID corresponding to the access request by referencing a duplicate copy ID specified for the access request and the derivative relation information, and sends a document corresponding to the identified original copy ID as a response to the access request.

According to the present invention, the derivative relation information shows the derivative relation between original copy IDs and duplicate copy IDs. Therefore, for an access request for which a duplicate copy ID is specified, an original copy ID associated with the duplicate copy ID can be uniquely identified by reference to the derivative relation information, and the document corresponding to the original copy ID can be provided to the user who has issued the access request.

In one embodiment of the present invention, the document-providing unit generates a new duplicate copy ID different from the duplicate copy ID specified for the access request and sends the new duplicate copy ID, as well as the identified document, as an updating ID for the duplicate copy ID specified for the access request, and the derivative relation information management unit adds to the derivative relation information a derivative relation between the duplicate copy ID specified for the access request and the new duplicate copy ID generated for the duplicate copy ID by the document-providing unit.

According to the present invention, the document-providing unit sends a duplicate copy ID for updating, which differs from the duplicate copy ID specified for the access request, as a response to the access request, and the derivative relation information management unit adds to the derivative relation information a derivative relation between the duplicate copy ID specified for the access request and the duplicate copy ID for updating. Therefore, by referencing the derivative relation information, a check can be made as to whether the access was made by the duplicate copy ID provided to the requesting user. In addition, the duplicate copy ID of the access request source is changed to the duplicate copy ID for updating. Therefore, even when the access request source distributes the duplicate copy ID it owns to a third party, a check can be made as to whether the access request source has issued an access request using the provided duplicate copy ID, by checking whether the duplicate copy ID distributed to the third party has been updated.

In one embodiment of the present invention, the history information management unit manages an access request source specified for the access request and the duplicate copy ID specified for the access request, by associating the access request source with the duplicate copy ID.

According to the present invention, the history information management unit manages an access request source specified for the access request and a duplicate copy ID specified for the access request, by associating the access request source with the duplicate copy ID. Therefore, by referencing the derivative relation information in conjunction with the history information indicating the relation between the access request source and the duplicate copy ID, it is possible to identify which duplicate copy ID (that is, to which access request source the duplicate copy ID was issued) was used by the access request source to access the document.

In one embodiment of the present invention, the document-providing unit references access condition information indicating an access condition for each duplicate copy ID, checks if the duplicate copy ID specified for the access request satisfies the access condition and, if the access condition is satisfied, provides the document as the response to the access request.

According to the present invention, the document-providing unit references the access condition information and, if the duplicate copy ID specified for the access request satisfies the access condition, provides the document as the response to the access request. Therefore, access to a document can be limited by defining a desired access condition according to the duplicate copy ID specified for the access request.

According to one embodiment of the present invention, there is provided a document management server which includes an identification information providing unit that receives a request to obtain identification information required for accessing a document from a client, generates the identification information for the received request, and sends the generated identification information to the client; a relation information management unit that manages relation information of the requested document and the identification information generated for the request; and a history information management unit that manages information on the client who has sent the request, associating with the identification information.

The above-described document management server may further include a document-providing unit that receives an access request for a document, identifies the document corresponding to the access request by referencing identification information designated by the access request and the relation information, and sends the identified document as a response to the access request.

In the above-described document management server, the document-providing unit may generate new identification information different from the identification information designated by the access request and sends the new identification information, as well as the identified document, as an updating information for the identification information designated by the access request. Further, the relation information management unit may store relation information of the identification information designated by the access request and the new identification information.

In the above-described document management server, the history information management unit may manage information of the client who has sent the access request and the identification information designated by the access request.

In the above-described document management server, the identification information providing unit may send access site information as well as the identification information as the response to the obtaining request, the access site information indicating an access site where the document corresponding to the obtaining request is stored.

In the above-described document management server, the document-providing unit may reference access condition information indicating an access condition for each identification information, checks if the identification information designated by the access request satisfies the access condition and, if the access condition is satisfied, provide the document as the response to the access request.

In the above-described document management server, the access condition information may include access request sources, which are permitted to access the document, for each identification information. Further, the document-providing unit may reference the access condition information and, if an access request source of the access request is included in the access condition information, provide the document as the response to the access request.

In the above-described document management server, for identification information which is included in the access condition information and whose associated access request sources have all already received the document, the document-providing unit may function to not provide the document thereafter as the response to an access request designating the identification information.

In the above-described document management server, the access condition information may include a document accessible period for identification information. Further, the document-providing unit may reference the access condition information and, if the access request is received during the accessible period for the identification information designated by the access request, provide the document as the response to the access request.

In the above-described document management server, the access condition information may include a maximum number of accesses for a document for identification information. Further, if a number of accesses to a document by the identification information designated by the access request is smaller than the maximum number of accesses, the document-providing unit may provide the document as the response to the access request.

The above-described document management server may further include a document registration unit that receives a document registration request, generates identification information associated with the document, registers the document in a storage unit associated with the document, and sends the generated identification information as a response to the registration request.

According to another embodiment of the present invention, there is provided a document management system which includes an identification information providing unit that receives a request to obtain identification information required for accessing a document from a client, generates the identification information for the received request, and sends the generated identification information to the client; a relation information management unit that manages relation information of the requested document and the identification information generated for the request; and a history information management unit that manages information of the client who has sent the request, associating with the identification information.

The document management system may further include an identification information obtaining unit that sends the request to obtain identification information and receives identification information as a response; a document-obtaining unit that sends a document access request, which designates the obtained identification information, to obtain a document associated with the identification information; and a document-providing unit that receives an access request for a document, identifies the document corresponding to the access request by referencing identification information designated by the access request and the relation information, and sends the identified document as a response to the access request.

In the above-described document management system, the document-providing unit may generate new identification information different from the identification information designated by the access request and sends the new identification information, as well as the identified document, as an updating information for the identification information designated by the access request. The relation information management unit may store relation information of the identification information designated by the access request and the new identification information. The document management system may further include an identification information changing unit that changes the identification information designated by the access request according to the updating information received as the response to the access request.

The above-described document management system may further include a document registration unit that receives a document registration request, generates identification information associated with the document, registers the document associated with the identification information, and sends the generated identification information as a response to the registration request; an identification information management unit that manages identification information instead of documents; and an obtaining request response unit that receives an obtaining request for a document and sends identification information of the requested document as a response to the obtaining request.

According to a further embodiment of the present invention, there is provided a storage medium readable by a computer, the storage medium storing a program of instructions executable by the computer to function as a document management server. The function includes receiving a request to obtain identification information required for accessing a document from a client; generating the identification information for the received request; sending the generated identification information to the client; managing relation information of the requested document and the identification information generated for the request; and managing information of the client who has sent the request associating with the identification information.

According to a still further embodiment of the present invention, there is provided a storage medium readable by a computer, the storage medium storing a program of instructions executable by the computer to function as a client that obtains a document via a network. The function includes an identification information obtaining unit that sends an obtaining request designating a document to be obtained and obtains the identification information, as a response to the obtaining request; a document obtaining unit that sends a document access request, which designates the obtained identification information, and obtains a document associated with the identification information and an updating information as a response to the access request; and an identification information changing unit that changes the identification information designated by the access request, according to the updating information.

According to another embodiment of the present invention, there is provided a node connected to a Peer-to-Peer network using a distributed hash table and sharing documents with other nodes. The node includes a document registration unit that generates first meta information including a hash value of a document to be registered and sends the document to be registered and the first meta information to a node where the document and the first meta information are to be stored; a shortcut issuance unit that, in response to a request for browsing a document, obtains the first meta information corresponding to the document and generates second meta information including a hash value of the first meta information, issues the shortcut including a hash value of the second meta information, and provides the shortcut to a user who has requested; a relation information management unit that manages relation information of the first meta information and the second meta information; and a history information management unit that manages information of a user to which the shortcut has been provided and a hash value of the second meta information included in the shortcut.

The node may further include a document-obtaining unit that obtains a requested document based on the meta information corresponding to a hash value included in the shortcut and the relation information, generates new meta information including the hash value included in the shortcut, and changes the identification information in the shortcut to a hash value of the new meta information. Further, the relation information management unit may add relation information of the meta information included in the shortcut and the new meta information.

According to a further embodiment of the present invention, there is provided a document management server that manages history information on access to documents. The document management server includes an identification information providing unit that receives a request to access a document from a client, and generates identification information for the received request; and a history information management unit that manages information of the requested document, the generated identification information, and a client who has sent a request to access the document based on the identification information.

According to a still further embodiment of the present invention, there is provided a document management method which includes receiving a request to obtain identification information required for accessing a document from a client; generating the identification information for the received request; sending the generated identification information to the client; managing relation information of the requested document and the identification information generated for the request; and managing information of the client who has sent the request associating with the identification information.

According to a yet further embodiment of the present invention, there is provided a client of a document management system. The client includes an identification information obtaining unit that sends the obtaining request to the document management server and receives identification information as a response; a document obtaining unit that sends a document access request, which designates the obtained identification information, and obtains a document associated with the identification information and an updating information as a response to the access request; and an identification information changing unit that changes the identification information designated by the access request, according to the updating information.

The entire disclosure of Japanese Patent Application No. 2005-185934 filed on Jun. 27, 2005, including specification, claims, drawings, and abstract, is incorporated herein by reference in its entirety.

While embodiments which are at present considered to be preferred embodiments of the invention have been described, it is to be understood that various modifications may be made thereto, and the appended claims are intended to cover all such modifications falling within the true spirit and scope of the invention.

What is claimed is:

1. A document management server connected to a network that receives documents from a client, comprising:
an identification information providing unit that receives a request for duplicated copy identification information required for accessing a document from a client, generates unique duplicated copy identification information for the received request, wherein the generated duplicated copy identification information is not identical to any already-generated original copy identification information and other duplicated copy identification information, and sends the generated duplicated copy identification information to the client;
a relation information management unit that manages relation information between the original copy identification information designated by the request and the duplicated copy identification information generated for the request, the original copy identification information uniquely identifying the document;
a history information management unit that manages information by associating the client who has sent the request, with the duplicated copy identification information generated for the request;
an identification information obtaining unit that send the request to obtain identification information and receives the generated duplicated copy identification information as a response;
a document-obtaining unit that sends a document access request, which designates the obtained duplicated copy identification information, to obtain a document associated with the duplicated copy identification information;

a document-providing unit that receives an access request for the document, identifies the original copy identification information corresponding to the access request by referencing the duplicated copy identification information designated by the access request and the relation information, and sends the document identified by the identified original copy identification information as a response to the access request; and an identification information changing unit that changes the identification information designated by the access request according to the updating information received as the response to the access request.

2. The document management server according to claim 1, wherein the history information management unit manages information of the client who has sent the access request and the original copy identification information designated by the access request.

3. The document management server according to claim 1, wherein the identification information providing unit sends access site information as well as the generated duplicated copy identification information as the response to the request, the access site information indicating an access site where the document corresponding to the request is stored.

4. The document management server according to claim 1, wherein the document-providing unit references access condition information indicating an access condition for each original copy identification information, checks if the original copy identification information designated by the access request satisfies the access condition and, if the access condition is satisfied, provides the document as the response to the access request.

5. The document management server according to claim 4, wherein the access condition information includes access request sources, which are permitted to access the document, for each original copy identification information, and the document-providing unit references the access condition information and, if an access request source of the access request is included in the access condition information, provides the document as the response to the access request.

6. The document management server according to claim 5, wherein the document-providing unit does not provide, for original copy identification information which is included in the access condition information and whose associated access request sources have all already received the document, the document thereafter as the response to an access request designating the original copy identification information.

7. The document management server according to claim 4, wherein the access condition information includes a document accessible period for original copy identification information, and the document-providing unit references the access condition information and, if the access request is received during the accessible period for the original copy identification information designated by the access request, provides the document as the response to the access request.

8. The document management server according to claim 4, wherein the access condition information includes a maximum number of accesses for a document for original copy identification information, and if a number of accesses to a document by the original copy identification information designated by the access request is smaller than the maximum number of accesses, the document-providing unit provides the document as the response to the access request.

9. The document management server according to claim 1, further comprising a document registration unit that receives a document registration request, generates identification information associated with the document, registers the document in a storage unit associated with the document, and sends the generated identification information as a response to the registration request.

10. A document management system comprising:
a processor;
an identification information providing unit that receives a request for duplicated copy identification information required for accessing a document from a client, generates unique duplicated copy identification information for the received request, wherein the generated duplicated copy identification information is not identical to any already-generated original copy identification information and other duplicated copy identification information, and sends the generated duplicated copy identification information to the client;
a relation information management unit that manages relation information between the original copy identification information designated by the request and the duplicated copy identification information generated for the request, the original copy identification information uniquely identifying the document;
a history information management unit that manages information by associating the client who has sent the request, with the duplicated copy identification information generated for the request;
identification information obtaining unit that send the request to obtain identification information and receives the generated duplicated copy identification information as a response;
a document-obtaining unit that sends a document access request, which designates the obtained duplicated copy identification information, to obtain a document associated with the duplicated copy identification information;
a document-providing unit that receives an access request for the document, identifies the original copy identification information corresponding to the access request by referencing the duplicated copy identification information designated by the access request and the relation information, and sends the document identified by the identified original copy identification information as a response to the access request; and
an identification information changing unit that changes the identification information designated by the access request according to the updating information received as the response to the access request.

11. The document management system according to claim 10, further comprising:
a document registration unit that receives a document registration request, generates identification information associated with the document, registers the document associated with the identification information, and sends the generated identification information as a response to the registration request;
an identification information management unit that manages identification information instead of documents; and
an obtaining request response unit that receives an obtaining request for a document and sends identification information of the requested document as a response to the obtaining request.

12. A storage medium readable by a computer, the storage medium storing a program of instructions executable by the computer to function as a document management server, the function comprising:
causing a document management server to receive a request for duplicated copy identification information required for accessing a document from a client;

causing a document management server to generate unique duplicated copy identification information for the received request, wherein the generated duplicated copy identification information is not identical to any already-generated original copy identification information and other duplicated copy identification information;

causing a document management server to send the generated duplicated copy identification information to the client;

causing a document management server to manage relation information between the original copy identification information designated by the request and the duplicated copy identification information generated for the request, the original copy identification information uniquely identifying the document;

causing a document management server to manage information by associating the client who has sent the request with the duplicated copy identification information generated for the request;

causing a document management server to receive an access request for the document;

causing a document management server to identify the original copy identification information corresponding to the access request by referencing the duplicated copy identification information designated by the access request and the relation information; and causing a document management server to send the document identified by the identified original copy identification information as a response to the access request.

13. A storage medium readable by a computer, the storage medium storing a program of instructions executable by the computer to function as a client that obtains a document via a network, the function comprising:

causing an identification information obtaining unit to send an obtaining request designating a document to be obtained and to obtain unique duplicated copy identification information, as a response to the obtaining request, the unique duplicated copy identification information is not identical to any already-generated original copy identification information and other duplicated copy identification information;

causing a document obtaining unit to send a document access request, which designates the obtained unique duplicated copy identification information, and to obtain a document associated with the unique duplicated copy identification information and an updating information as a response to the access request;

causing an identification information changing unit to change the unique duplicated copy identification information designated by the access request, according to the updating information; and causing a document-providing unit to receive an access request for a document, identifies original copy identification information corresponding to the access request by referencing the duplicated copy identification information designated by the access request and the relation information, and sends the document identified by the identified original copy identification information as a response to the access request.

14. A document management server that manages history information on access to documents connected to a network that receives the documents from a client, the document management server comprising:

an identification information providing unit that receives a request for duplicated copy identification information required for accessing a document from a client, generates the unique duplicated copy identification information for the received request, wherein the generated duplicated copy identification information is not identical to any already-generated original copy identification information and other duplicated copy identification information;

a history information management unit that manages information by associating the client who has sent the request with the duplicated copy identification information generated for the request;

an identification information obtaining unit that send the request to obtain identification information and receives the generated duplicated copy identification information as a response;

a document-obtaining unit that sends a document access request, which designates the obtained duplicated copy identification information, to obtain a document associated with the duplicated copy identification information;

a document-providing unit that receives an access request for the document, identifies the original copy identification information corresponding to the access request by referencing the duplicated copy identification information designated by the access request and the relation information, and sends the document identified by the identified original copy identification information as a response to the access request; and an identification information changing unit that changes the identification information designated by the access request according to the updating information received as the response to the access request.

15. A document management method comprising:

receiving a request for duplicated copy identification information required for accessing a document from a client;

generating unique duplicated copy identification information for the received request, wherein the generated duplicated copy identification information is not identical to any already-generated original copy identification information and other duplicated copy identification information;

sending the generated duplicated copy identification information to the client;

managing relation information between the original copy identification information designated by the request and the duplicated copy identification information generated for the request, the original copy identification information uniquely identifying the document;

managing information by associating the client who has sent the request with the duplicated copy identification information generated for the request;

receiving an access request for the document;

identifying the original copy identification information corresponding to the access request by referencing the duplicated copy identification information designated by the access request and the relation information; and sending the document identified by the identified original copy identification information as a response to the access request.

16. A client of a document management system, the client comprising:

an identification information obtaining unit that sends the obtaining request to the document management server and receives unique duplicated copy identification information as a response, the unique duplicated copy identification information is not identical to any already-generated original copy identification information and other duplicated copy identification information;

a document obtaining unit that sends a document access request, which designates the obtained unique duplicated copy identification information, and obtains a document associated with the unique duplicated copy identification information and an updating information as a response to the access request;

an identification information changing unit that changes the identification information designated by the access request, according to the updating information; and a document-providing unit that receives an access request for a document, identifies original copy identification information corresponding to the access request by referencing the duplicated copy identification information designated by the access request and the relation information, and sends the document identified by the identified original copy identification information as a response to the access request.

* * * * *